US008418226B2

(12) United States Patent
Gardner

(10) Patent No.: US 8,418,226 B2
(45) Date of Patent: Apr. 9, 2013

(54) PERSISTENT SERVICING AGENT

(75) Inventor: Philip B. Gardner, Woodbury, MN (US)

(73) Assignee: Absolute Software Corporation, Vancouver, BC (CA)

(*) Notice: Subject to any disclaimer, the term of this patent is extended or adjusted under 35 U.S.C. 154(b) by 1354 days.

(21) Appl. No.: 11/386,040

(22) Filed: Mar. 20, 2006

(65) Prior Publication Data

US 2006/0272020 A1 Nov. 30, 2006

Related U.S. Application Data

(63) Continuation-in-part of application No. 11/093,180, filed on Mar. 28, 2005.

(60) Provisional application No. 60/663,496, filed on Mar. 18, 2005, provisional application No. 60/663,615, filed on Mar. 18, 2005, provisional application No. 60/756,796, filed on Jan. 7, 2006.

(51) Int. Cl.
*G06F 7/04* (2006.01)

(52) U.S. Cl.
USPC ............ 726/3; 726/1; 726/2; 726/22; 726/26; 713/155; 713/156; 713/157; 713/158; 713/159; 711/147; 711/148; 711/149; 711/150; 711/151; 711/152; 711/153; 709/225; 380/247; 380/248; 380/249; 380/250

(58) Field of Classification Search ................ 726/1–21; 711/147–153; 709/225; 380/247–250; 713/155–159
See application file for complete search history.

(56) References Cited

U.S. PATENT DOCUMENTS

| 5,444,850 A | 8/1995 | Chang |
| 5,680,547 A | 10/1997 | Chang |
| 5,715,174 A | 2/1998 | Cotichini et al. |

(Continued)

FOREIGN PATENT DOCUMENTS

| JP | 2002-236590 | 8/2002 |
| JP | 2003-141011 | 5/2003 |

(Continued)

OTHER PUBLICATIONS

International Search Report of Counterpart PCT Application No. PCT/US2006/010381.

*Primary Examiner* — Christopher Brown
*Assistant Examiner* — Roderick Tolentino
(74) *Attorney, Agent, or Firm* — Liu & Liu

(57) ABSTRACT

A tamper resistant servicing Agent for providing various services (e.g., data delete, firewall protection, data encryption, location tracking, message notification, and updating software) comprises multiple functional modules, including a loader module (CLM) that loads and gains control during POST, independent of the OS, an Adaptive Installer Module (AIM), and a Communications Driver Agent (CDA). Once control is handed to the CLM, it loads the AIM, which in turn locates, validates, decompresses and adapts the CDA for the detected OS environment. The CDA exists in two forms, a mini CDA that determines whether a full or current CDA is located somewhere on the device, and if not, to load the full-function CDA from a network; and a full-function CDA that is responsible for all communications between the device and the monitoring server. The servicing functions can be controlled by a remote server.

26 Claims, 14 Drawing Sheets

U.S. PATENT DOCUMENTS

| | | |
|---|---|---|
| 5,748,084 A | 5/1998 | Isikoff |
| 5,764,892 A | 6/1998 | Cain et al. |
| 5,802,280 A | 9/1998 | Cotichini et al. |
| 6,081,850 A | 6/2000 | Garney |
| 6,244,758 B1 | 6/2001 | Solymar et al. |
| 6,269,392 B1 | 7/2001 | Cotichini et al. |
| 6,275,942 B1 | 8/2001 | Bernhard et al. |
| 6,300,863 B1 | 10/2001 | Cotichini et al. |
| 6,507,914 B1 | 1/2003 | Cain et al. |
| 6,530,018 B2 * | 3/2003 | Fleming, III ............ 713/1 |
| 6,574,655 B1 | 6/2003 | Libert et al. |
| 6,674,368 B2 | 1/2004 | Hawkins et al. |
| 6,833,787 B1 | 12/2004 | Levi |
| 7,012,520 B2 | 3/2006 | Webb, Sr. |
| 7,046,138 B2 | 5/2006 | Webb, Sr. |
| 7,124,101 B1 | 10/2006 | Mikurak |
| 7,200,658 B2 | 4/2007 | Goeller et al. |
| 7,266,849 B1 | 9/2007 | Gregory et al. |
| 7,346,781 B2 | 3/2008 | Cowie et al. |
| 7,373,553 B2 | 5/2008 | Tripp et al. |
| 7,400,650 B1 * | 7/2008 | DiMambro ............ 370/469 |
| 7,484,245 B1 * | 1/2009 | Friedman et al. ......... 726/27 |
| 2002/0091924 A1 | 7/2002 | Vlcan et al. |
| 2002/0092014 A1 | 7/2002 | Shibusawa et al. |
| 2002/0194500 A1 | 12/2002 | Bajikar |
| 2003/0005316 A1 | 1/2003 | Girard |
| 2003/0051090 A1 | 3/2003 | Bonnett et al. |
| 2003/0172306 A1 | 9/2003 | Cain et al. |
| 2003/0227392 A1 | 12/2003 | Ebert et al. |
| 2004/0039800 A1 | 2/2004 | Black et al. |
| 2004/0249927 A1 | 12/2004 | Pezutti |
| 2005/0044404 A1 | 2/2005 | Bhansali et al. |
| 2005/0125449 A1 | 6/2005 | Wong et al. |
| 2006/0053302 A1 * | 3/2006 | Yasaki et al. ............ 713/183 |

FOREIGN PATENT DOCUMENTS

| | | |
|---|---|---|
| JP | 2003-228486 | 8/2003 |
| WO | 96/13002 | 5/1996 |
| WO | WO 01/84455 | 11/2001 |
| WO | WO 2005/096122 | 10/2005 |

* cited by examiner

Client Logic Flow

PERSISTENT SERVICING AGENT

This application claims the priority of U.S. Provisional Application No. 60/663,496, filed Mar. 18, 2005, U.S. Provisional Application No. 60/663,615, filed Mar. 18, 2005, and U.S. Provisional Application No. 60/756,796, filed Jan. 7, 2006. This application is a continuation-in-part application of U.S. patent application Ser. No. 11/093,180, filed Mar. 28, 2005. These documents are fully incorporated by reference as if fully set forth herein.

All publications referenced herein are fully incorporated by reference, as if fully set forth herein.

BACKGROUND OF THE INVENTION

1. Field of the Invention

The present invention relates to a persistent or tamper resistant servicing agent in a computer and network environment.

2. Description of Related Art

In today's competitive business environment, information technology (IT) is playing an increasingly important role in the exchange of knowledge in day-to-day business functions. Individuals, systems, organizations, and other business assets are interconnected in this emerging economic web, and as this IT landscape grows increasingly complex, so does the need to efficiently manage computer assets. As a result, organizations now, more than ever, are recognizing the need to take control of, manage and secure their computer asset base, in order to maximize their investment and attempt to control costs.

The amount of time and fiscal resources required to manage computers in a network can be significant. These assets support key business processes such as e-commerce and business intelligence. If these assets are not protected, and there is no ability to proactively manage them, the potential for short and long-term loss is enormous.

One of the main challenges organizations are encountering is the ability to manage a specific software image and required updates on the device storage drive, and to track the location and ongoing migration of their computers. Knowing what assets one has and how they are changing in time is fundamental to ongoing IT asset and policy management. This knowledge also enables better planning and budgeting, such as hardware or software upgrades, or computer retirement. This problem is further compounded as companies expand geographically, and as the adoption of mobile and remote systems becomes increasingly popular. Keeping track of these assets and the software images on them is not only important for the value of the computer itself, but often more importantly, for the protection of the valuable data residing on the machine. A missing or misconfigured asset may have readable confidential or proprietary information on it, or not have anti-virus updated, or it may still have rights to access a corporate network. Companies must be able to account for their assets and their configuration; and know not only what is on them in terms of hardware and software, but also where they are, and who is using them. Only with this additional information can organizations begin to address issues of security and regulatory compliance with remote and mobile users.

With the increase in processing power for mobile computing devices, more and more individuals have opted for mobile computing devices, either as replacements to their desktop units, or as additional devices for home or small business networks. While individuals are not primarily concerned with computer asset inventory and configuration management, they nonetheless share similar concerns as large organizations, in regards to keeping track of personal computer assets and protection of personal data.

Most IT departments will support the statement that conventional asset management solutions can't accurately account for the ever-increasing population of remote and mobile users. In fact, a typical organization will lose up to 15% of its PC assets over a 2 year period to PC drift1—where assets are not necessarily lost or stolen, but they simply cannot be accounted for due to the many times they've changed owners or departments since first being provisioned. On average, most organizations can only accurately identify 65% of their actual PC asset base when asked to do an inventory. Best practices demands that IT know where at least 90% of PC assets are located at all times.

Remote and mobile computer assets that travel outside a LAN are problematic in a number of ways. Initially, most asset tracking software cannot track these machines when they are not connected to the local network. Also, these remote machines pose a large security threat to the entire IT network. More often than not the remote user is responsible for the administration and configuration updating of the machine rather than the IT administrator. Most users are normally not as security conscious as they should be. Users may lower security settings, install malicious software unknowingly, let anti-virus software fall out of date and fail to install the latest security patches. What may seem like minor security faults to a remote user can have drastic effects on the entire network. When the remote user connects the LAN they may infect the entire network due to these relaxed security concerns. Without effective asset management tools for these remote machines IT administrators cannot ensure the integrity of the entire network. A network is only as secure as its weakest link. The annual CSI/FBI survey on computer security shows that 57% of stolen PC assets are used to perpetrate additional crimes against corporations.

In a response to recent corporate accounting scandals, identity theft and malicious hacking, governments are establishing regulations that force businesses to protect and be accountable for all sensitive digital information. The Sarbanes-Oxley Act of 2002 is an excellent example of such a regulation. With Sarbanes-Oxley there is increased exposure when not accurately reporting assets. Executives are asked to legally verify if the proper controls and regulations are in place to ensure accurate asset reporting. It is now the fiduciary responsibility of the CFO and CEO to ensure that accurate asset reporting is performed. The legal, regulatory and financial exposure to an organization that inaccurately reports its asset base could be significant. Computers often make up a material percentage of an organizations asset base and thus require accurate reporting. The Gramm-Leach-Bliley (GLB) Act is another regulation to ensure customer records are protected in the financial sector. Likewise, the Health Insurance Portability and accountability Act (HIPAA) established federal privacy standards to protect the confidentiality of medical records and health information. If organizations do not effectively track all of their computing assets there could be severe regulatory concerns.

For an asset tracking and/or configuration management application to undertake its tracking function, it should be able to resist certain level of tampering by a user. In the context of asset tracking, typically, an authorized user is a person responsible for some aspect of the life-cycle management of the computer. In this context, the tracking agent should be able to protect the authorized user from the accidental removal of the tracking agent, while allowing the legitimate need to disable the agent (for example at end of life of the computer asset). An unauthorized user is a person who wishes to remove the agent software, but who is typically not responsible for the life-cycle management of the computer. A reason for a deliberate, unauthorized attempt to remove the agent would include actions of a thief or potential thief who wishes to ensure that any tracking software is permanently removed. An attempt of un-authorized yet accidental removal would include someone's successful or unsuccessful attempt to install a new operating system, or re-image the hard drive, for example.

Attempts to track, manage and update PC assets and their configurations are further challenged in view of the fact that during a PC's lifecycle it will undergo many hardware, software and image changes including: break/fix repairs, configuration changes, operating system reinstalls, hard-drive reformats/replacements, system crashes and user-driven configuration changes. Many of these changes will require a reinstallation of the operating system whereby the original footprint, identification or tracking agent of the PC asset can be disabled or removed. This change, if not diligently recorded and tracked, is the beginning of a PC asset drifting from a known state into an unknown state. These routine PC life cycle operating requirements can increase the complexity and challenge of tracking PC assets, especially those that are remote and mobile.

Heretofore, existing asset tracking applications are deficient in the Windows NT/2000/XP environment to the extent that they do not display the features necessary to achieve the required persistence against tampering by unauthorized users. These tracking applications are generally easily defeated by the unauthorized or accidental user actions referred above, or other simple acts such as deletion of registry settings or deletion of application files.

Absolute Software Corporation, the assignee of the present invention, has developed and is marketing Computrace, a product and service that securely tracks assets and recovers lost and stolen assets, and AbsoluteTrack, a secure asset tracking, and inventory management, solution powered by the Computrace technology platform. Computrace deploys a stealth agent, which is a software client that resides on the hard drive of host computers. Once installed, the agent automatically contacts a monitoring center on a regular basis transmitting location information and all auto-discovered asset data points. Ongoing communication between the agent and the monitoring center requires no user intervention and is maintained via an Internet or phone connection. As long as the computer is turned on and has either a connection to a telephone line or access to the Internet (through an ISP or through a company network), the Computrace agent will be able to report asset data to the monitoring center. The user intervention-free communication between the agent and a monitoring center ensures the authorized user of the agent to have secure access to up-to-date location information and comprehensive asset data about their entire computer inventory. Whether used stand-alone, or as a complement to an existing asset management tool, AbsoluteTrack has been a cost-effective application service for helping businesses of all sizes monitor remote, mobile and desktop computers and perform daily hardware and software inventory tracking functions. Computrace has been an effective tool to track theft of mobile computers, and to recovery of stolen mobile computers.

The technology underlying various Computrace products and services have been disclosed and patented in the U.S. and other countries, which patents had been commonly assigned to Absolute Software Corporations. See, for example, U.S. Pat. Nos. 5,715,174; 5,764,892; 5,802,280; 6,244,758; 6,269,392; 6,300,863; and 6,507,914; and related foreign patents.

Further information concerning AbsoluteTrack has been published by Absolute Software Corporation (e.g., AbsoluteTrack—Secure Computer Asset Tracking Solution, a white paper, published Apr. 25, 2003).

The agent that is deployed on each protected device is stealthy, making it resistant to detection by the user of the computer. The level of tamper-resistance directly impacts the difficulty of detection and level of skill required to defeat the Computrace service. While the Computrace agent is as tamper-resistant as a disk-based utility can be, it would be desirable to develop an improved agent that provide additional level of tamper-resistance, and further enable, support and/or provides services beyond asset tracking and recovery.

SUMMARY OF THE INVENTION

The present invention is directed to a servicing Agent for enabling, supporting and/or providing services relating to management and protection of assets (including without limitation hardware, firmware, software, data, etc.) and their software configurations, with improved tamper resistance. The services may include asset tracking, asset recovery, data delete, software deployment, etc.

The servicing Agent comprises multiple modules. Each module is designed to function in a specific operating environment. The modular design provides flexibility in configuring the agent for deployment in the particular operating environment, for example, in the BIOS or on the hard drive, without having to rebuild the entire application. The Agent may be implemented wholly or partly by software (including hardware microcode), and may reside in software, firmware and/or hardware components within a system.

In accordance with one aspect of the invention, a loader module is loaded and gains control during power-on self-test (POST). The Agent can be relied upon to enable, support and/or provide services (e.g., tracking, data delete and software updates) with respect to the device in which it is installed, as well as assets associated with the device in which the Agent is installed. Once control is handed to the loader, it acts to load other functions and modules of the Agent, including as necessary and at the appropriate time, the reloading across the network (e.g., Internet) of portions of the Agent that may have been removed or missing from the machine. The servicing Agent has the ability to be persistent in spite of actions that might ordinarily be expected to remove it.

In one embodiment of the present invention, at least one module and/or data for the agent code of the persistent Agent is implemented in the firmware of a device, such as a ROM, and in particular the basic input output system (BIOS) or its functional equivalent, resident in the device. The servicing Agent can load itself to be ready to perform its designed servicing function (e.g., tracking, data delete and software updates), independent of the operating system of the device, and can adapt itself to the environment (e.g., the operating system of the device) that controls certain basic operations (e.g., input/output) of the device by detecting the operating environment, so that the Agent can make use of such basic operations of the system to perform its designed servicing functions.

In another embodiment, the persistent agent comprises three main modules, including the "Computrace" Loader Module (CLM), the Adaptive Installer Module (AIM), and the Communications Driver Agent (CDA). The CLM loads the AIM, which in turn locates, validates, decompresses and adapts the CDA for the detected OS environment. In one embodiment, the CDA exists in two forms, a partial or mini CDA and a full-function CDA. The function of the mini CDA is to determine whether a full or current CDA is located somewhere on the device, and if not, to load the full-function CDA across the network (e.g., Internet) from a monitoring server. The full-function CDA is then responsible for all communications between the device and the monitoring server. In another embodiment, the different modules, and in particular the CLM, may be programmable, which may require custom functionality to adapt to their specific environment. By providing Agent in several modules, the level of customization could be kept to a minimum. In one embodiment, at least the CLM is stored in firmware, such as the BIOS, with one or more of the other modules stored in hard drive partition gap, or the hard drive Host Protection Area (HPA). In another embodiment, the CLM is stored in a substitute Master Boot Record (MBR), or a combination of the foregoing.

In another aspect, the servicing functions that the Agent performs can be controlled by a remote server, by combining generic sub-function calls available in the Agent. This programmable capability of the Agent allow its functionality to be extended based on server-driven commands. The extensibility is critical to the successful deployment of the Agent in firmware, such as the BIOS, where space is at a premium and frequent updates to add or change functionality is not economical. The extensibility feature is a primary component of the activation process and the reactivation process of the Agent.

In another aspect of the present invention, the extensibility of the Agent enables a data delete application, for erasing data stored at the client device.

In yet another aspect of the present invention, the extensibility of the Agent enables software updates to be delivered and programmed onto the client device.

The invention improves upon the ability for a pre-deployed servicing Agent to remain "active" regardless of the actions of a "user" of the device. In the context of the invention, "active" refers to the specific ability of a component of the Agent software to load itself and then reconstruct its full capabilities over a wide range of "user" actions, including, for example in one embodiment, low-level commands to format the hard drive, re-installation of an operating system, re-imaging of the hard drive using an imaging utility, and replacement of the hard drive. "User" refers to an individual who is performing these actions and may be acting in an authorized or unauthorized capacity. Their actions to remove the Agent may be intentional or accidental.

The invention protects the authorized user from the accidental removal of the servicing Agent, while allowing the legitimate need to disable the Agent (for example at end of life of the computer asset). The invention prevents an unauthorized user from removing the Agent software. The persistent attributes of the present invention have value in asset protection, data and network security, IT asset management, software deployment, and other types of applications. In the context of a secure, stealthy device-tracking software application, the invention is of significant value as it makes theft of a valuable asset much more difficult to conceal, as regardless of actions taken by a thief, the software will persist and make itself available for contacting a remote monitoring center. In addition, the persistent nature of the servicing Agent provides peace of mind to security personnel, as it provides confidence that the Agent cannot be accidentally removed. In the context of a secure asset management application, this is of further value as it ensures continuity of tracking an asset over its whole lifecycle. A key challenge for IT administrators today is the ability to track assets for the whole lifecycle. During the lifecycle devices are frequently transferred from one user to another, during which they may be re-imaged, or have the operating system reinstalled or otherwise be subjected to maintenance procedures that render tracking of the asset difficult, but which is made easier by the present invention. In addition to asset tracking services, other services can be enabled, supported and/or provided by the persistent and extensible Agent.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The present description is of the best presently contemplated mode of carrying out the invention. This description is made for the purpose of illustrating the general principles of the invention and should not be taken in a limiting sense. The scope of the invention is best determined by reference to the appended claims. The present invention can find utility in a variety of implementations without departing from the scope and spirit of the invention, as will be apparent from an understanding of the principles that underlie the invention. For purpose of illustrating the features of the persistent Agent of the present invention, reference is made to asset tracking as one example of the services provided by the Agent, and a tracking Agent, and data delete as another example of the services provided by the Agent. It is understood that the Agent may be used for other services, such as distribution of software and updates, without departing from the scope and spirit of the present invention.

The detailed descriptions that follow are presented largely in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps require physical manipulations of physical quantities. Often, but not necessarily, these quantities take the form of electrical or magnetic signals capable of being stored, transferred, combined, compared, and otherwise manipulated. It will be further appreciated that the line between hardware and software is not always sharp, it being understood by those skilled in the art that software implemented processes may be embodied in hardware, firmware, or software, in the form of coded instructions such as in microcode and/or in stored programming instructions.

Tracking System Overview

Figure 1:
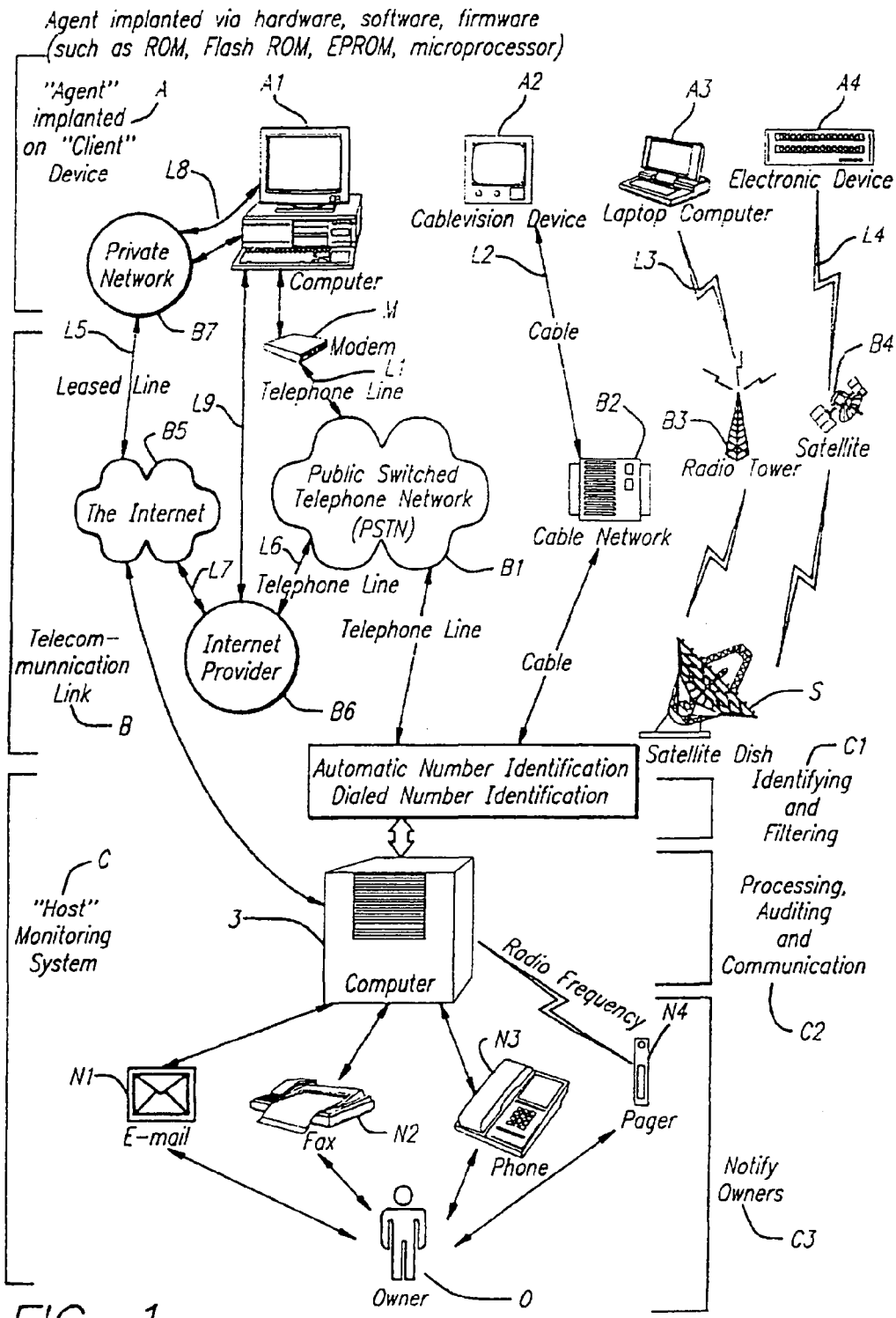
FIG. 1 is a schematic diagram depicting representative communication links including networks by which asset tracking may be implemented in accordance with one embodiment of the present invention.

Asset tracking function is an example of the services that can be enabled, supported and/or provided by the persistent Agent of the present invention. Referring to FIG. 1, the asset tracking system in accordance with one embodiment of the present invention involves a client/server architecture, which may comprise the following main components: (a) client device A consisting of any one of the electronic devices shown which have been implanted with the Agent. The Agent software runs on the client devices for the purpose of reporting asset, location and other information, and receiving instructions from a remote server to program the Agent to support and execute a desired function. The invention provides the ability of the agent software to be more persistent to accidental or deliberate removal and the programmability of the client from the monitoring server; (b) a communication link B, such as an information exchange network, which may include switched communications networks, the Internet, private and public intranet, radio networks, satellite networks, and cable networks; and (c) a host monitoring system C, which include a host monitoring server 3 that monitors the communications between the client device A and the host monitoring system C, which is contacted on a regular basis by the client devices records information from the client devices. The monitoring server also provides instructions to the client on what actions to perform, including what actions the client is to perform, what data to collect and the clients next scheduled call time. The client devices contact the monitoring server via the communication link B (e.g., an IP connection or via a dial-up telephone connection). The monitoring server can perform its functions either as a service offered over the Internet, or as a customer-owned server over a corporate intranet. The host monitoring system C may include a reporting and administration portal, which provides customers, administrators and asset tracking service providers the ability to view data and manage the functions of the monitoring server and the client devices. The host monitoring server can notify customers, designated representative and law enforcement agencies concerning status of asset monitoring via a number of communication means. Each of these components will be further elaborated below.

Referring to FIG. 1, useful client devices A in which the persistent servicing Agent in accordance with the present invention can be implemented include, but are not limited to, general or specific purpose digital processing, information processing and/or computing devices, which devices may be standalone devices or a component part of a larger system (e.g., a mass storage device), portable, handheld or fixed in location. Different types of client devices may be implemented with the servicing Agent application of the present invention. For example, the servicing Agent application of the present invention may be applied to desktop client computing devices, portable computing devices (e.g., laptop and notebook computers), or hand-held devices (e.g., cell phones, PDAs (personal digital assistants), personal electronics, etc.), which have the ability to communicate to an external server, as further explained below. The client devices may be selectively operated, activated or configured by a program, routine and/or a sequence of instructions and/or logic stored in the devices, in addition to the operating systems resident in the devices. In short, use of the methods described and suggested herein is not limited to a particular processing configuration.

To facilitate an understanding of the principles, features and functions of the present invention, they are explained with reference to its deployments and implementations in illustrative embodiments. By way of example and not limitation, the present invention is described in reference to examples of deployments and implementations relating to the context of the Internet and in reference to a laptop or notebook computer as the client device A (computer A1 is schematically represented as a desktop device, but may instead comprise a portable computing device). It will be understood by one of ordinary skill in the art that the application of this invention to any currently existing of future global network is contemplated herein. Further, although the Internet aspect of this invention is described and illustrated with respect to client computer A1 it should be understood that the Internet application is readily applicable to other client devices without departing from the scope and spirit of the present invention.

FIG. 1 is a schematic representation of the communication links B in the form of information exchange networks in which the present invention may be deployed for asset tracking. The information exchange network accessed by the asset tracking Agent application in accordance with the present invention may involve, without limitation, distributed information exchange networks, such as public and private computer networks (e.g., Internet, Intranet, WAN, LAN, etc.), value-added networks, communications networks (e.g., wired or wireless networks), broadcast networks, cable networks, radio networks, and a homogeneous or heterogeneous combination of such networks. As will be appreciated by those skilled in the art, the networks include both hardware and software and can be viewed as either, or both, according to which description is most helpful for a particular purpose. For example, the network can be described as a set of hardware nodes that can be interconnected by a communications facility, or alternatively, as the communications facility, or alternatively, as the communications facility itself with or without the nodes. It will be further appreciated that the line between hardware, firmware and software is not always sharp, it being understood by those skilled in the art that such networks and communications facility, and the components of the persistent agent technology platform, involve software, firmware and hardware aspects.

The Internet is an example of an information exchange network including a computer network in which the present invention may be implemented. Details of various hardware and software components comprising the Internet network (such as servers, routers, gateways, etc.) are not shown, as they are well known in the art. Further, it is understood that access to the Internet by the user/client devices and servers may be via any suitable transmission medium L, such as coaxial cable, telephone wire, wireless RF links, or the like, and tools such as browser implemented therein. Communication between the servers and the clients takes place by means of an established protocol. As will be noted below, the persistent asset tracking Agent application of the present invention may be configured in or as one of the clients, which can communicate with one of the servers over the information exchange network. This invention works in conjunction with other existing technologies, which are not detailed here, as it is well known in the art and to avoid obscuring the present invention. Specifically, for example, methods currently exist involving the Internet, web based tools and communication, and related methods and protocols.

Referring to FIG. 1, the host monitoring system C may simply be a computer (e.g., a server 3) that is configured to exchange data with client devices A that have an Agent installed thereon, via one or more (concurrently or in parallel) of the communication links B. The host monitoring system C includes routines for identifying and filtering external user access (C1). The host monitoring system C also communicates (C3) directly or indirectly with the owners and/or representatives of the tracked client devices A concerning information related to the tracked devices A (e.g., network location information), via the reporting and administration portal. For example, the host monitoring system C may communicate by email, fax, paging, phone, etc. to the owner of a tracked device, his designated representative, a company designated department or representative, a staffed monitoring service station, law enforcement agency, etc. Alternatively, the host monitoring system C may itself be a staffed monitoring service station, or part of a law enforcement agency. The host monitoring system C and/or downstream target locations (e.g., staffed monitoring service station) may maintain an inventory list of the tracked assets, or the lost/stolen status of the tracked assets. Though only one host monitoring system C is shown in FIG. 1, a plurality of host monitoring systems C may be distributed across the communication networks, for example in different geographic regions.

One of the important functions of the Agent is to contact the host monitoring system C to report the identity, location, and/or other information relating to its associated client device A. According to one embodiment of the invention, each client device A is associated with a unique identification, which may be part of the information delivered by the client device A to the host monitoring station C. The unique identification can be in the form of an Electronic Serial Number (ESN), Media Access Control (MAC) number, Internet host name/IP address, an owner/user specified identification, or other numeric, alpha or alphanumeric information that represents, identifies and/or allows identification of the client device, and further information such as date and time, which might present further basis for determination or validation of the actual or virtual geographical location of the Agent and its identification.

The general concept of using a stealth Agent to track assets and/or recover stolen or lost devices A had been disclosed in the patents assigned to Absolute Software Corporation, the assignee of the present invention. The Agent has to determine the appropriate time for it to call the host monitoring system C. If is suffice to mention briefly here that once the Agent is installed and running it will either periodically (e.g. every N hours), or after specified periods have elapsed (e.g. from system or user logon), or after device system boot, or upon the occurrence of certain pre-determined conditions, or triggered by some internal or external events such as hardware reconfiguration, report its identity and/or location via the communication link B to the host monitoring system C, without user intervention to initiate the communication process. The Agent may also concurrently report its identity and location via two or more available communication links B to the host monitoring system C. The location of the Agent, hence the tracked device, may be determine, for example, by a traceroute routine to obtain a listing of all IP routers used to enable communication between the client device A and host monitoring system C via the Internet.

All location and asset related data transmitted to the monitoring system C may be kept in a central repository and can be accessed 24×7 by authorized administrators via secure web-based or network based console. In one embodiment, when the agent transfers location and asset data, the monitoring system C sends and programs the instructions for the next set of tasks, and the next scheduled call time and date to the Agent. The monitoring system C archives all Agent transmissions, providing a current and accurate audit trail on each computer (C2). A comprehensive computer asset tracking and inventory solution will capture this information on systems connected locally to the corporate network, as well as on remote and mobile systems connecting remotely via IP or dial-up. In addition, information needs to be captured on a regular basis to ensure the most up-to-date view of the assets is being provided.

As will be further explained below, the tracking Agent is persistent with high resistance to tampering, and the Agent may be configured to remain transparent to an unauthorized user. The Agent, in order to remain hidden to the user, will not interfere with any running applications unless designed to interfere. The novel features, functions and operations of the Agent in accordance with the present invention will be discussed more fully below.

Overview of Architecture of Persistent Agent Platform

IT administrators need the ability to consistently track all computer assets throughout their entire life cycle. This includes remote and mobile computers that operate outside the LAN. Asset tracking agents need to be installed once at the beginning of a computers life cycle and communicate regularly until the computer is retired. During its life cycle a computer will undergo many user, hardware and software changes and it is critical that the tracking agent be persistent and able to report changes in these three areas. The persistent Agent in accordance with the present invention can report the original identification of the PC asset and its status throughout the PCs lifecycle, regardless of, for example, IMAC and break/fix operations, even if the hard drive has been reformatted or the operating system reinstalled or tampered with. The persistent Agent is designed to protect itself and will survive any unauthorized removal attempts. This persistence feature is critical in order to remain connected to PC assets in case of theft and to ensure accurate and secure asset tracking.

The persistent Agent is a low-level undetectable software client that resides on the host computer. The Agent is persistent software and extremely difficult to remove. The Agent incorporates self-healing technology that functions to rebuild the agent software installation even if the agent service is deleted by conventional means. The agent will survive an operating system installation, hard drive format, and even a hard drive replacement. This survivability is critical to the success of asset tracking and theft recovery (and other services that the Agent may also enable, support and/or provide). The self-healing function is not resident within the file system and is more difficult to detect and remove than traditional software. The persistent and self-healing portion of the software is difficult to remove because it is stealthy. The software is normally removed only by an authorized IT administrator with the correct password. The self-healing feature will function to repair an Agent installation in newly formatted and installed operating systems as well as newly imaged systems.

In another aspect of the present invention, the Agent is programmable to extend its functions beyond what was initially programmed. The Agent communicates with a remote server, wherein the remoter server sends and programs the Agent by providing the Agent with instructions for next set of tasks.

The Agent may be implemented in the hardware, firmware or software of any electronic device. Alternatively, the Agent may be implemented in any component of a device, as with an electronic component such as the DSP in a modem or the CPU in a computer. Furthermore, the functionality of the Agent may be implemented in the circuitry of any hardware device capable of establishing a communication link through sending and/or receiving packets of data. For example, the Agent may be embodied in non-volatile memory (such as ROM BIOS, ROM, Flash ROM, EPROM, EEPROM, or the like) of the electronic device, a software program, a micro-code program, a digital signal processor ("DSP") program or a built-in function of the operating system.

In accordance with one embodiment of the present invention, the persistent tracking Agent (hereinafter also referred to as a "Persistent Agent") is embodied in BIOS (or its functionally equivalent system). As is known in the art, BIOS is the startup code that always executes on system power up or reset. This can be microcode embedded into the processing unit or software (instructions) starting from a fixed location in memory space. These instructions handles startup operations such as the Power-On Self-Test (POST) and low-level control for hardware, such as disk drives, keyboard, and monitor, independent of and typically before the booting of the operating system resident on the device. In one embodiment, the Persistent Agent is embodied in firmware, such as a read-only memory (ROM), in the client device A, such as personal computers. When BIOS is embodied in a chip, it includes a set of instructions encoded in ROM. It is understood that all references to BIOS hereunder is not limited to ROM bases BIOS.

Popular brands of BIOS chips on motherboards sold today include Phoenix Technologies, Intel, IBM and American Megatrends, Inc. Some system components have their own BIOS chip, whose instructions are also read into the device's memory at startup. The BIOS on a hard disk controller, for example, stores a table of tracks and sectors on the drive. Unlike the BIOS based Agent disclosed in Absolute Software Corporation's earlier patents, the present invention presents an improvement, that includes the use of a BIOS-based loader for the Agent. The BIOS-based loader makes the Agent components more persistent, and hence it is more difficult to defeat the asset tracking or other servicing function. The BIOS-based loader also eliminates the need to reverse the boot order on the machine and thus removes a step in the manufacturing process. A BIOS-based loader also reduces potential compatibility issues with products such as anti-virus scanners, full-disk encryption and other utilities that read or modify the operating system loader in the Master Boot Record (MBR).

Figure 2:
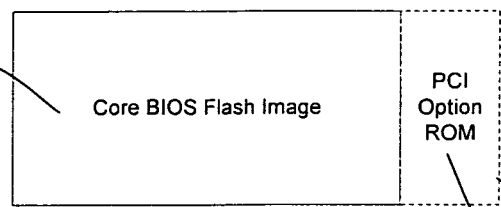
FIG. 2 is a schematic diagram depicting attachment of a PCI Option ROM to the BIOS, which includes the Persistent Agent, in accordance with one embodiment of the present invention.
Figure 3:
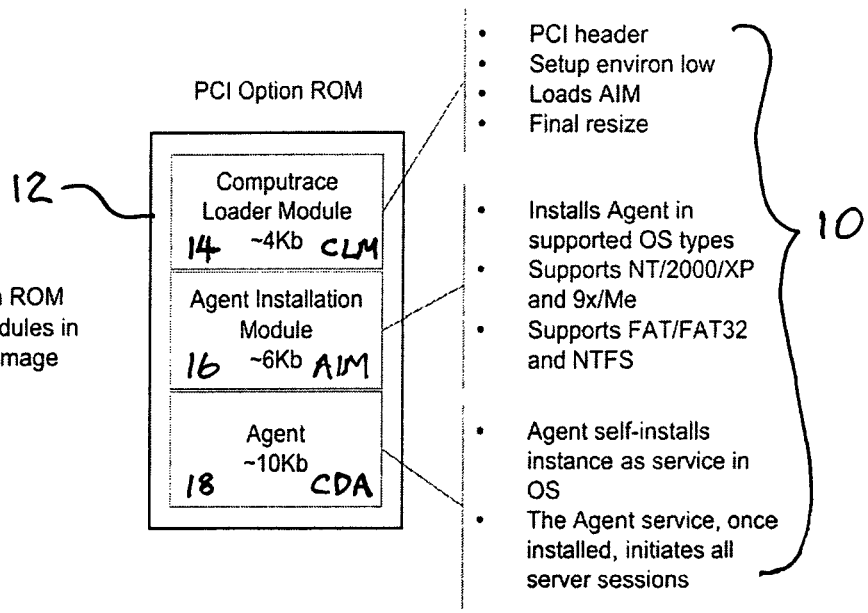
FIG. 3 is a schematic diagram depicting the module components of the Persistent Agent present in the PCI Option ROM, in accordance with one embodiment of the present invention.

In accordance with one embodiment of the present invention, the Persistent Agent 10 is initially stored in an Option ROM, such as a an Option ROM based on peripheral component interface bus—PCI Option ROM 12 attached to the Core BIOS Flash Image 13, as depicted in FIG. 2. There may be additional Option ROMs attached (not shown), which supports other functions not related to the Persistent Agent. The Persistent Agent 10 comprises multiple modules. The three main modules are the "Computrace" Loader Module (CLM) 14, the Adaptive Installer Module (AIM) 16, and the Communications Driver Agent (CDA) 18, as depicted in FIG. 3.

The small (can be approximately 22 Kb—compressed) PCI Option ROM 12 containing the three modules of Persistence Agent 10 are bound to the standard core flash image and loaded into protected memory along with the BIOS and other Option ROMs during BIOS POST. The small PCI Option ROM is recognized by POST and loaded into read/write shadow memory along with the BIOS and other Option ROMs during BIOS POST. This configuration provides a modular architecture that will enable the security enhancing features while minimizing the development effort and number of interface points in the core BIOS which must be re-qualified.

The CLM incorporates the PCI (in the case of a PC device), Image Management and Execution Environment functions. It is responsible for the interface to the BIOS, locating and unpacking the AIM, resizing the PCI Option ROM to its final size, and executing the AIM within the proper context on the system. The AIM accesses the hard drive, detects active operating systems, and adapts the mini CDA to the discovered installations. The mini CDA is the communications driver. It includes support for the HTTP protocol, an application layer for communicating with the monitoring server, a service layer for interfacing to an OS and an adaptive layer for interfacing with the AIM.

The mini CDA is responsible for checking whether the full-function CDA is available in the computer's file system to run as a service when the operating system is loaded. If the full-function CDA is not available, the mini CDA will initiate download of the full-function CDA from the monitoring server. Once the full function CDA is present, it will frequently check for newer versions of itself on the monitoring server, and if available, will replace itself with a new version.

These and other embodiments of the various modules will be discussed more fully below.

BIOS POST Sequence and Option ROM Load Process

Figure 4:
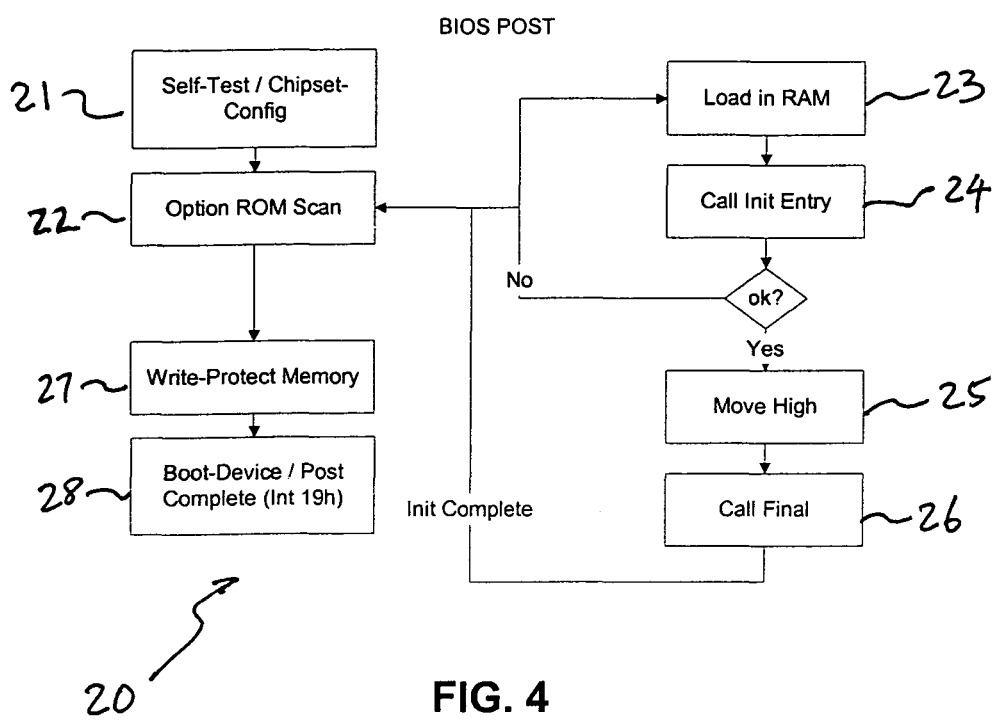
FIG. 4 is a schematic flow diagram depicting the Option ROM loading routine, in accordance with one embodiment of the present invention.

The Option ROM load process 20 is depicted in the flow diagram of FIG. 4. At boot up of the client device A in which the Persistent Agent 10 has been deployed, the BIOS POST process performs a self-test and chipset configuration routine 21, and reaches a point where the bus is scanned at 22 for Option ROMs that support functions on the motherboard or on extension cards. At this point, the PCI Option ROM 12 containing the Persistence Agent 10 is loaded into low memory (e.g., a RAM) at 22 and its initialization vector (CLM 14, as discussed below) is called at 23. The initialization routine determines the status of the function to be supported and its final image size. Subsequently at 25 and 26, the BIOS POST process then completes the Option ROM scan and calculates the final locations of each Option ROM whose function is present. Each PCI Option ROM is then relocated and its completion vector is called, including the Persistent Agent enabled PCI Option ROM 12. (In certain Phoenix BIOS, for example, the PCI Option ROMs are not relocated, but simply shrink to fit the final size declared in the header before returning from the initialization vector.) After all Option ROMs have been relocated, the BIOS memory is write-protected at 27. The boot-devices are called in turn until an operating system is successfully started at 28. At this point, both the device operating system and the Agent would be running simultaneously.

PCI Option ROM

A. Loader Module CLM

The CLM 14 is responsible for setting up a temporary Execution Environment for the AIM 16, loading and decompressing the AIM 16 and calling it in an appropriate context. The last "act" of the CLM 14 is to shrink to a minimum size (2K) and return execution to POST. The CLM only "fails" if the AIM 16 is not found or invalid.

The CLM 14 is the interface to POST, or the "front-end" of the PCI Option ROM 12. The PCI Option ROM header is in the CLM 14 and its entry points are advertised according to the standard in this header. The CLM 14 provides two function points for integration with the BIOS POST.

1. ROM header and PCI Option ROM header pair
2. Interrupt Handler

These and other functions of various components of the PCI Option ROM will be described below in reference to an IBM BIOS, for example installed in the IBM Model T43 notebook computer.

1. ROM Entry Point

The initial interface is presented during PCI Option ROM enumeration by the BIOS. This interface is a standard legacy ROM header and PCI Option ROM header pair. For example, in reference to a Phoenix BIOS, a PCI Vendor ID of 1917h and the device ID 1234h may be set. As noted above, when the BIOS POST process scans the bus for Option ROMs that support functions on the motherboard or on extension cards, the whole PCI Option ROM 12 is loaded and the initialization vector of the CLM 14 is called. The Option ROM loads and executes a compressed COM application. The ROM entry point is defined by the START_SEG label. The START_SEG Segment contains the ROM header and its link to the PCI Option ROM header. The Option ROM is initialized by a FAR CALL to offset 3 in the Option ROM. The jump instruction chain here passes control to the OptRomProc.

Figure 5:
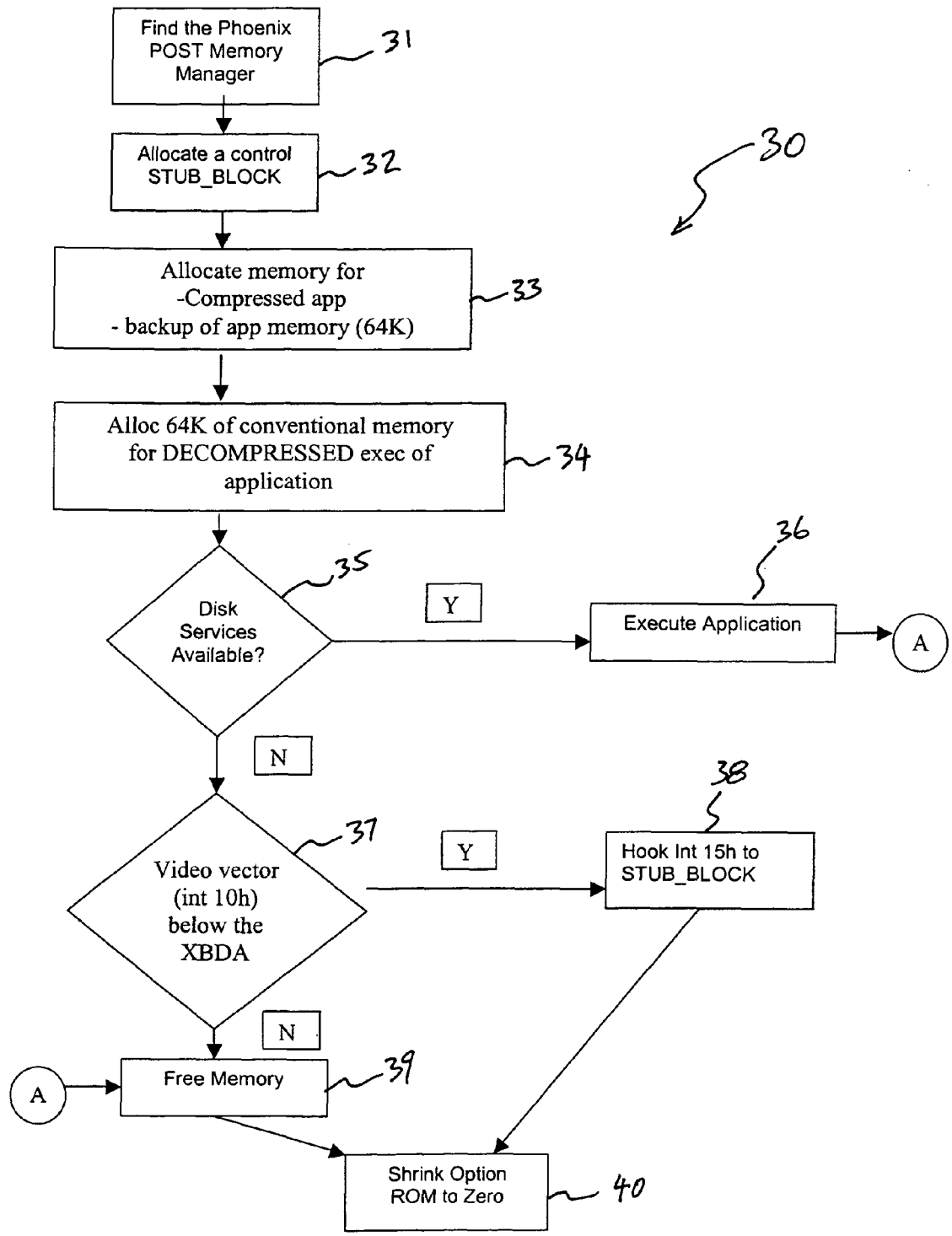
FIG. 5 is a schematic flow diagram depicting the routine performed by the CLM of the Persistent Agent, in accordance with one embodiment of the present invention.

Referring to FIG. 5, the routine 30 undertaken by the PCI Option ROM CLM 14 may be summarized as follows:

a. Find the BIOS POST Memory Manager at 31.
b. Allocate a control STUB_BLOCK at 32(e.g., 2K for interrupt handling and application execution).
c. Allocate extended memory for the COMPRESSED application and a backup of application memory (e.g., 64K) at 33.
d. Allocate a block of application memory (e.g., 64K) in conventional memory for the DECOMPRESSED execution of the application at 34.
e. If disk services are available at 35 (as determined by count at 40:75h; number of hard disks), then execute application immediately at 36, then proceed to free memory at 39 and shrink Option ROM to Zero at 40.
f. Else if Video vector (int 10h) is below the XBDA (40:0Eh) at 37, then hook Int 15h to STUB_BLOCK, at 38, and Shink Option ROM to Zero at 40.
g. Else nothing to hook and nothing to do—Failed! Free memory at 39, and shrink Option ROM to Zero at 40.

2. Interrupt Handler

The second interface is an Interrupt Handler. This executes after the initial load and execution of the initialization procedure of the PCI Option ROM from memory allocated from the BIOS POST memory manager. This interface executes first on int 15h and then on an alternate trigger. Int 19h is the preferred alternate trigger and the default. The interrupt handler is only activated if BIOS Disk Services (int 13h) is not yet available during initialization of the PCI Option ROM. Int 19h is the preferred trigger method because in some cases there is no Int 13h issued by the BIOS after the last int 15h/func 9100h. Another issue is that physical drive 80h by not be consistent with physical drive 80h at Int 19h until shortly before Int 19h. ComFileStub contains the main interrupt hook entry point.

Figure 6A:
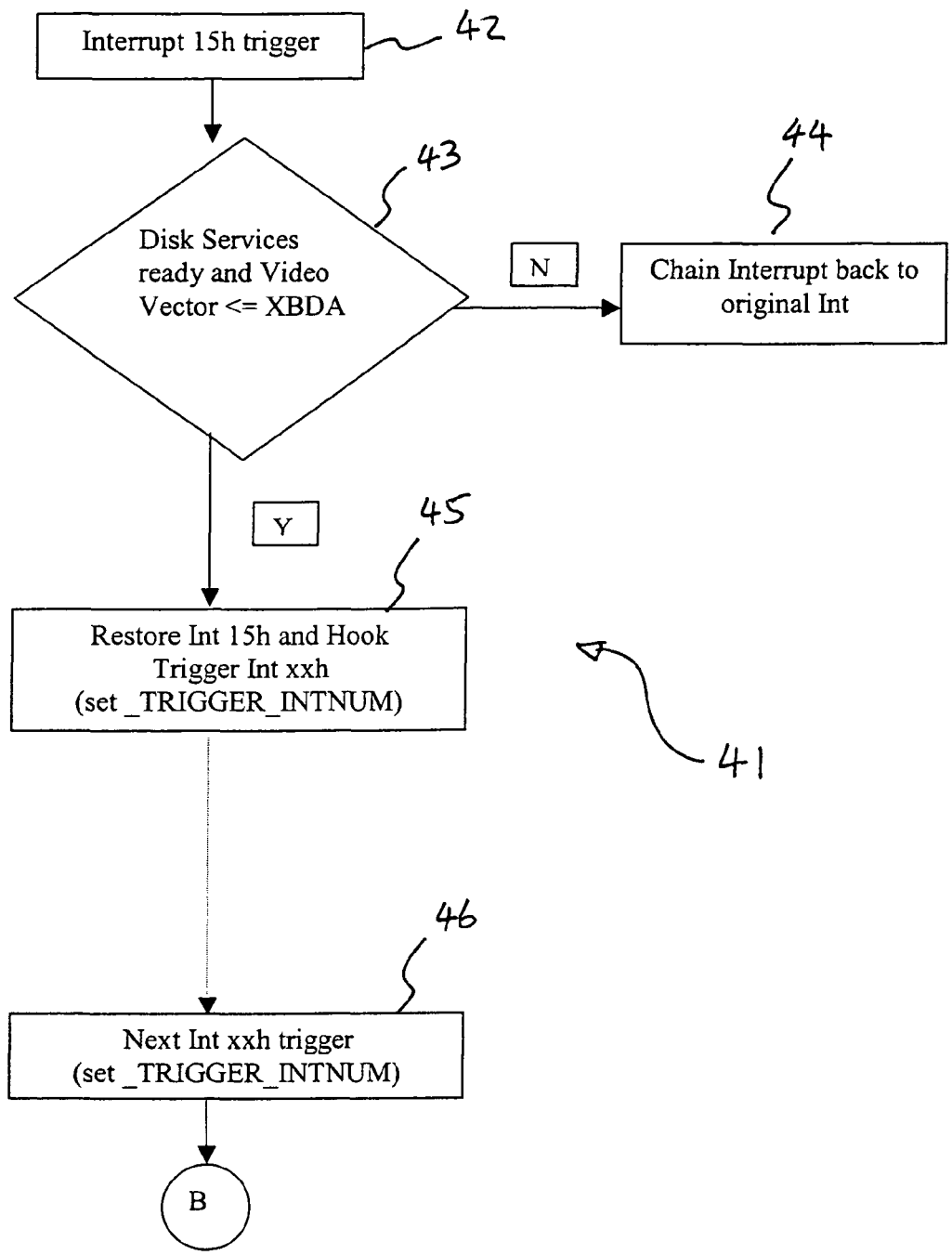
FIGS. 6a and 6b are schematic flow diagrams depicting the routine performed by the Interrupt Handler of the CLM, in accordance with one embodiment of the present invention.
Figure 6B:
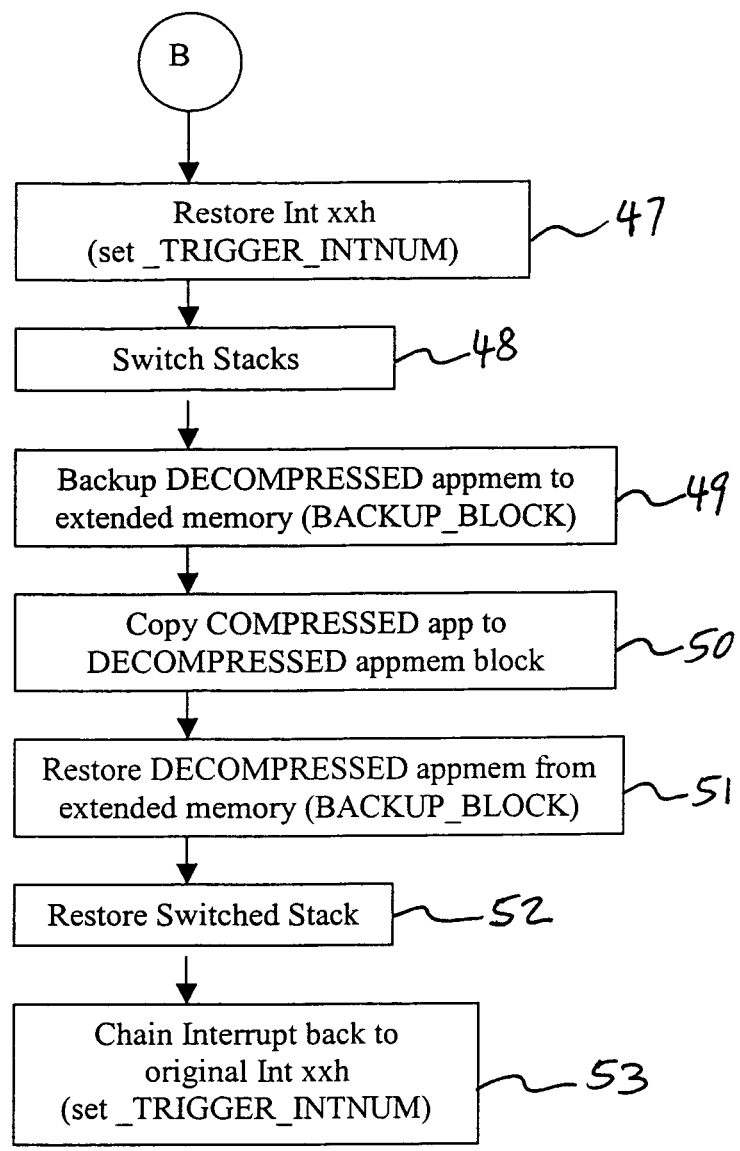

Referring to FIGS. 6*a* and 6*b*, the process 41 undertaken by the Interrupt handler may be summarized as follows:

a. On each int 15h trigger at 42, function 9100h (hard disk IRQ complete, this indicates that INT 13h is in use.)
b. Check hard disk services available at 43(count 40:75h).
c. And Video vector above or equal to the XBDA (40:0Eh; this indicates that SETUP phase of POST is complete).
d. Chain if not yet ready at 44.
e. Restore Int 15h hook and hook a trigger Int xxh at 45 (_TRIGGER_INTNUM setting=Int 13h or Int 19h) to wait for the next Int xxh.
f. On the next trigger Int xxh (Int 13h or Int 19h) at 46, restore trigger Int xxh at (Int 13h or Int 19h).
g. Switch stacks at 48.
h. Backup copy of DECOMPRESSED appmem to extended memory BACKUP_BLOCK at 49.
i. Copy COMPRESSED application to DECOMPRESSED appmem block at 50.
j. Call application and restore contents of DECOMPRESSED appmem from extended memory BACKUP_BLOCK at 51.
k. Switch stacks back at 52.
l. Chain to complete the intercepted trigger Int xxh call at 53.

B. Agent Installer Module (AIM)

Figure 7:
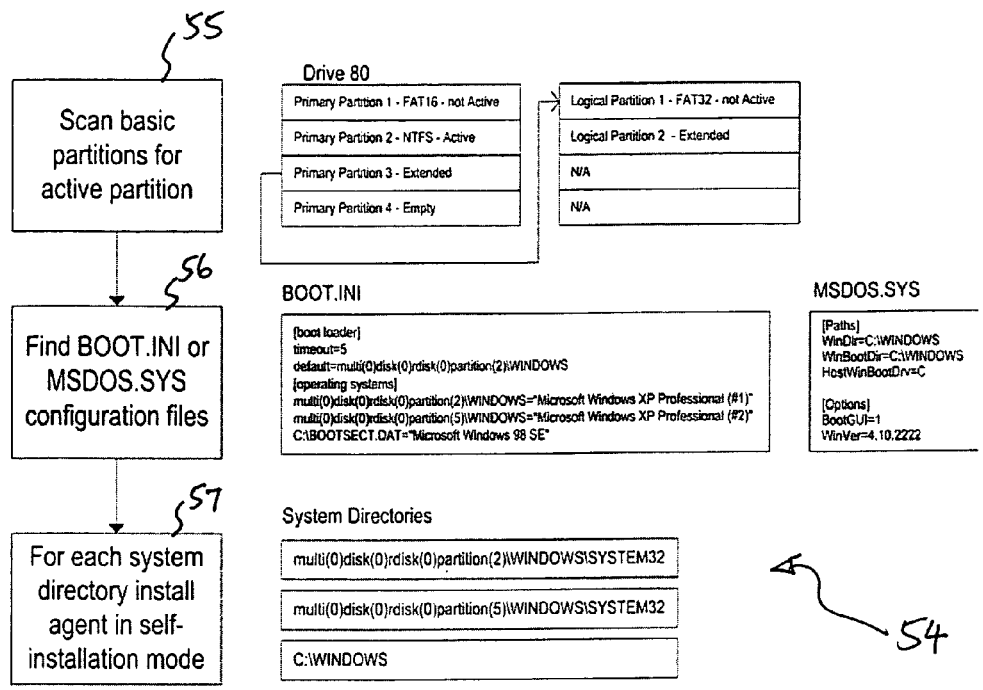
FIG. 7 is a schematic flow diagram depicting the routine performed by the AIM of the Persistent Agent, in accordance with one embodiment of the present invention.

The AIM 16 is designed to be loaded under the execution context set up by the CLM 14. Referring to FIG. 7, the routine 54 undertaken by AIM 16 includes the following steps. When executed, the AIM 16 scans the partition table to find the active partition at 55. On the active partition it looks for the operating system (OS) system directories or the configuration files at 56, which point to them and then creates and installs the installer mode instance of the Communication Driver Agent CDA at 57. The installation mechanism is specific and unique to each OS, and AIM 16 uses standard OS installation mechanisms.

C. Communications Driver Agent (CDA)

The CDA 18 exists in two forms, a mini CDA and a full-function CDA. In one embodiment, the mini-CDA resides in the PCI Option ROM 12. The function of the mini CDA is to determine whether a full-function and/or current version CDA is installed and functioning on the device, and if not, to load the full-function CDA across the Internet from the host monitoring server C (FIG. 1). The full-function CDA is then responsible for all communications between the device and the host monitoring server C.

Figure 8:
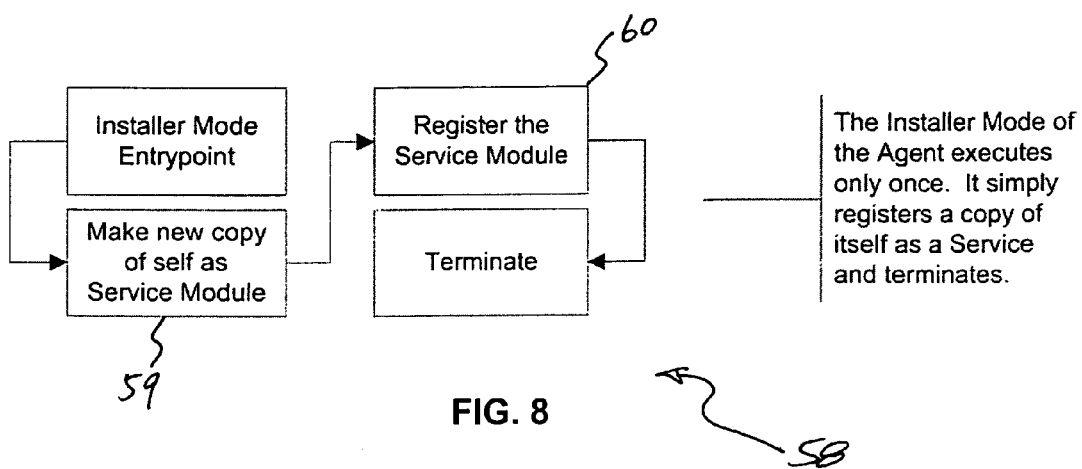
FIG. 8 is a schematic flow diagram depicting the Installer Mode routine of the CDA of the Persistent Agent, in accordance with one embodiment of the present invention.

Referring to FIG. 8, the mini CDA first runs (via AIM 16) an installer mode 58, in which the primary function of the mini CDA is to register as an OS service. The installer mode instance of the agent creates another instance of itself at 59 and registers the copy with the Service Manager at under 2000/XP, for example, at 60. The executable then cleans up the installer copy of itself and exits. It runs in Installer mode only once, as the full-function CDA takes over the normal operations of the CDA from that point.

Figure 9:
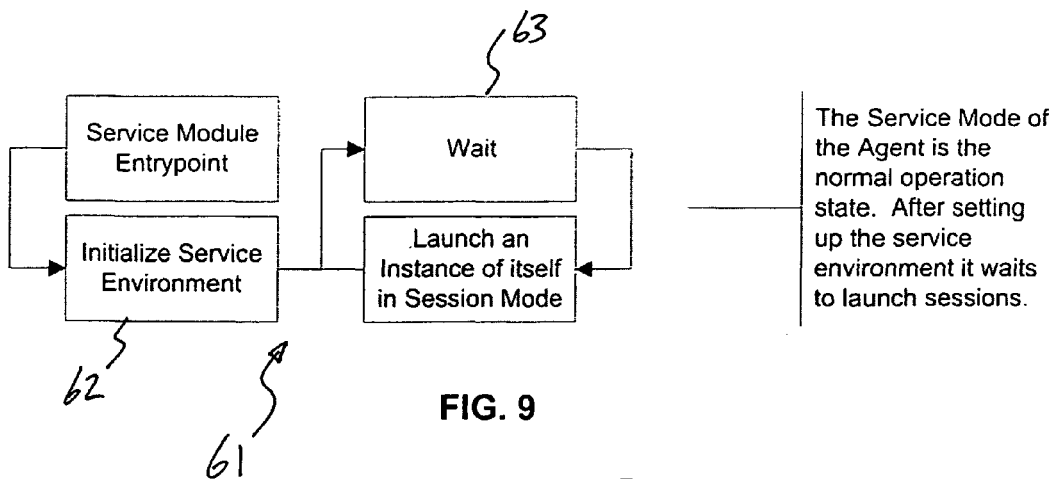
FIG. 9 is a schematic flow diagram depicting the Service Mode routine of the CDA, in accordance with one embodiment of the present invention.

Referring to FIG. 9, on subsequent start of the OS, the service mode instance of the mini CDA is executed as a Service under 2000/XP, for example. The Service sets up a service manager environment at 62 and at an appropriate time (after waiting at 63), launches an instance of itself as an application at 64. The application mode is the normal mode of operation of the mini-CDA. The Agent is now in "active" mode.

Figure 10:
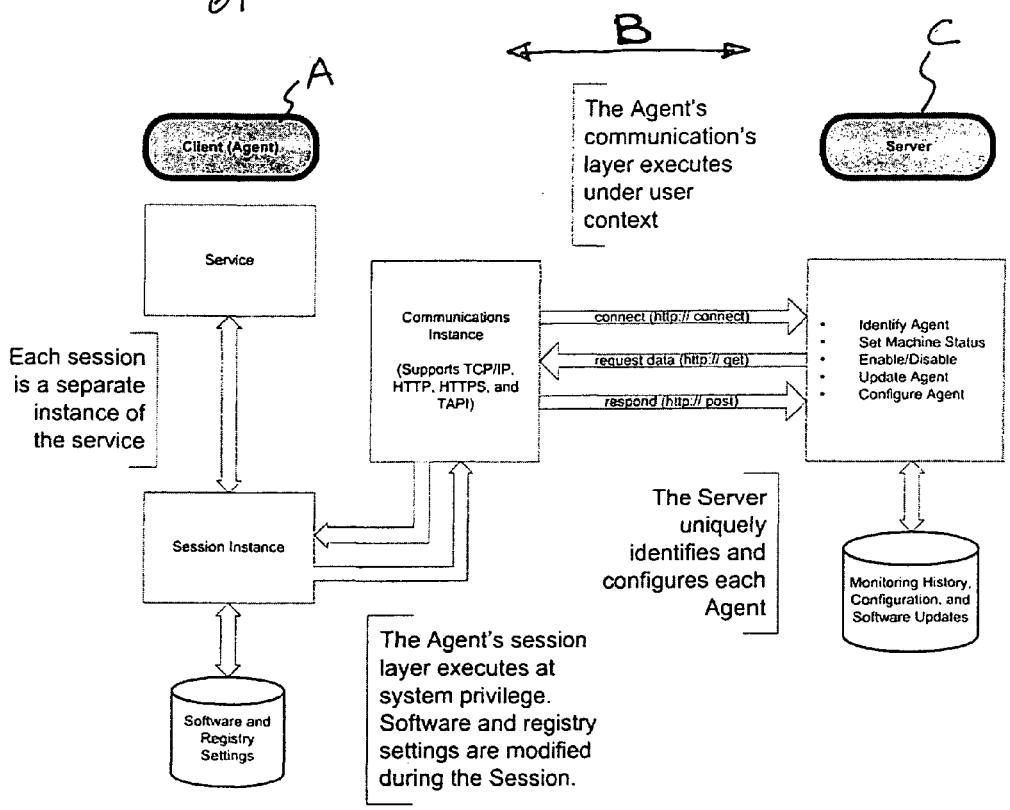
FIG. 10 is a schematic depiction of the CDA in Application Mode, in accordance with one embodiment of the present invention.

If the current full-function CDA is not found in the device, the mini CDA application initiates communications with the host monitoring server C using, for example, the HTTP protocol by default, as depicted in FIG. 10. Other protocols are supported by additional modules are uploaded from the host monitoring server C to the Agent. The host monitoring server C performs functions such as identifying the Agent, storing monitoring history, configuration and software updates. The host monitoring server C conducts a session with the mini CDA to activate and install a full version of the CDA, disable the mini-CDA (e.g., at end of life of the device, or for disabling self healing function so that it can be upgraded to a newer version), update the Agent, or configure the Agent, as required for that platform. The communications between the client device A and the server C via communication link B are depicted in FIG. 10 in accordance with one embodiment of the present invention. For example, if the mini CDA provides identification or type of BIOS or device platform to the server C, a copy of BIOS or platform specific full-function CDA or its updates can be downloaded to the device A.

As noted before in reference to FIG. 1, the general concept of using a stealth Agent to track devices and/or recovery stolen or lost devices A had been disclosed in the patents assigned to Absolute Software Corporation, the assignee of the present invention. The application level functionality of the device tracking and communication functions of the full-function CDA can be similar to the functions of the stealth agent earlier described and patented by the assignee of the present invention (which patents have been incorporated by reference herein) and/or the AbsoluteTrack asset tracking product developed by the assignee of the present invention.

Generally, in one embodiment of the Internet application, which can run alone or concurrently with or applications based on other communication links B (e.g., PSTN), the Agent initiates a call to the host at predetermined, random, event based or deferred intervals. According to one embodiment, in its "active" mode the Agent calls the host every predetermined number of hours. The Agent uses the current time and the unique Agent identification to encode an Internet host name. In one embodiment, the Agent then forms a DNS request using an encoded Internet host name. The Agent sends this DNS request to the host through the Internet. If the agent's attempt to send the DNS request to the Internet times out after a predetermined time period has elapsed, the Agent will sleep for a predetermined period of time, e.g., one minute, and then repeat the call. If the call fails due to another error (such as the absence of Winsock facilities which enable communication with the Internet, and/or the failure of the computer to be configured for TCP/IP communication) then the Agent will repeat the cycle several hours later. In this way, the Agent inherently checks for the existence of an Internet connection.

After sending its DNS request, the Agent waits for a response. Upon receiving a valid response from the host, the IP address is extracted from the response and compared against a reference IP address. For example, the reference IP address may be set as "204.174.10.1". If the extracted IP address equals "204.174.10.1" then the Agent's mode is changed from "active" to "alert" on the Internet side. The host will send this IP address, for example, when it, or the operator at the host, has determined that the Agent identification matches one of the entries on a list of reported lost or stolen computers stored at the host. If the IP address extracted from the host response does not equal "204.174.10.1" then the Agent remains in active mode and does not call the host for another four hours. However, when the Agent goes into "alert" mode in the Internet application, the Agent initiates a traceroute routine which provides the host with the Internet communication links that were used to connect the client computer to the host. These Internet communication links will assist the host system in tracking the client computer. The IP address of the source of the DNS query is sent to the host within the DNS query. However, if the source of the query is transmitted through a "proxy" server, then the IP address of the client computer (which may not be unique since it may not have been assigned by the InterNIC) will likely be insufficient to track the location of the client computer. In such a scenario, it is necessary to determine the addresses of other IP routers that were accessed to enable communication between the client and the host. These addresses and the times that they were accessed are compared with internal logs of the proxy server that record its clients' Internet access history. In this way, the client can be uniquely identified and located. Additionally, the transfer of the Internet application into "alert" mode is a condition that triggers the transfer of the other available communication applications to "alert" mode.

CDA—Server Communication

A. Extensible Protocol

Deploying the Persistence Agent successfully in BIOS, for example, makes heavy use of an extensibility designed into the communications protocol. Without this extensibility the Agent would be larger and require frequent updates to add or change functionality. Such updates are neither practical nor economical, since the BIOS is programmed into the flash EEPROM of the platform and special tools (most often requiring user interaction) must be used to update the BIOS. Also, intensive testing is performed by the OEM on the BIOS since its integrity is critical to the operation of the computer. The key elements of the extensible protocol are:

1) A method to read and write Agent's memory space
2) A method to allocate memory
3) A method to free memory
4) A method to load an external module
5) A method to determine a procedure address
6) A method to call a procedure The Agent's protocol is designed to provide these mechanisms.

The format of a read packet is:
|ADDRESS|NUMBER_OF_BYTES

The format of a write packet is:
|ADDRESS|NUMBER_OF_BYTES DATA . . .

The communications protocol distinguishes a read packet by determining that no DATA is contained in the packet. If there is DATA, then it is a write. This address based protocol is the basis of the extensibility design.

Figure 14:
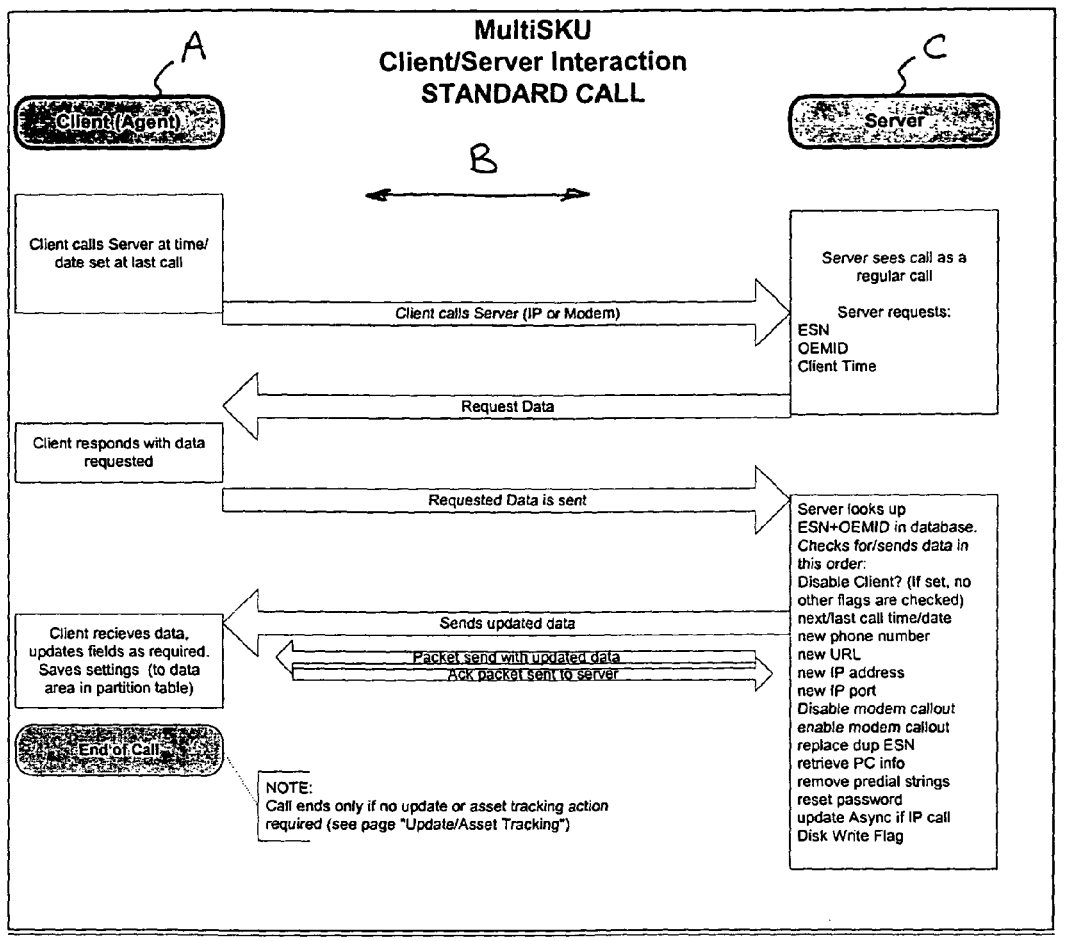
FIG. 14 is a schematic depiction of a communication session between the CDA of the Persistent Agent and the remote server, in accordance with one embodiment of the present invention.

The general sequence of steps in a communication session, based on the extensible protocol, between the client device A and the server C via communication link B is schematically depicted in FIG. 14 in accordance with one embodiment of the present invention. Examples of specific transactions handled by a communication session is further disclosed below.

A typical session begins with a connection sequence such that:

1) The client connects
2) The server responds with a special read from address 0xffffffff|0xffffffff|4
3) The client replies with the address of its session handle The handle structure contains important information like the version of the client, the version of the supporting OS and the Command Packet. The client interprets "writes" to the Command Packet as "special" and will call the CommandPacketProcessor( ) function when the Command Packet is written. The CommandPacketProcessor( ) function takes the arguments: function code, parameter address, number of parameters, and the result address. The minimum set of function codes which must be implemented are:

CMD_FUNC_CCALL (Call 'C' function)
CMD_FUNC_STDCALL (Call a STDCALL function)
CMD_GETMH (Get Module Handle)
CMD_GETPA (Get Procedure Address)
CMD_ALLOC (Allocate Memory)
CMD_FREE (Free Memory)

Other function codes which may be implemented are for chaining Command Packets together to improve efficiency:

CMD_ENDC (End Chain)
CMD_IF (Conditional Branch)
CMD_GOTO (Unconditional Branch)

This small library of commands can be strung together in packets to accomplish any management task. The critical management tasks are:

1) CreateFile
2) Load as Library of functions, or as executable
3) Call procedure in the operating system or from created file
4) Allocate and Free Memory in the context of the Agent B. Transactions The following section describes the communication between the Agent and the remote (e.g., monitoring) server (also known as CTSRV). Note that each item described represents one transaction (message pair between the client and server). Some transactions occur on every agent call, others depend on the service implemented and others are done on one call only as a result of a flag set by maintenance or recovery personnel. Below are tables of typical communications sessions between the server and the Agent.

Basic Communication (Every Agent Call)

| Action | Packets |
| --- | --- |
| Initialize communication, get client handle | 1 |
| Read client flags | 2, 3 |
| Read client settings | 4, 5 |
| Lock agent | 6, 7 |
| Get address of TAPI info structure on the client | 8, 9 |
| Get address of local IP from TAPI info structure | 10, 11 |
| Receive client local IP info | 12, 13 |
| Request for serial #, version, client time, next call date, next call date IP, last call date, last call date IP and OEM CTID | 14-17 |
| Unlock agent | 18, 19 |
| Lock agent | 20, 21 |
| Send next call date | 22, 23 |
| Send last call date | 24, 25 |
| Set flag call successful on the client. | 26, 27 |

Call With Basic Asset Tracking (Every Call—If Client Has Subscribed to Such Tracking Services With the Monitoring Service Provider) Using AT1 DLL On Client AT1 data (for subscribers to asset tracking/monitoring services) is retrieved. Note that this is a sub-set of the data collected by the AT2 DLL. Either the AT1 or AT2 DLL will be executed on the client, never both.

| Action | Packets |
| --- | --- |
| Basic Agent Call as Described Above | 1-27 |
| Unlock agent | 28, 29 |
| Allocate one big chunk of memory on the client | 30, 31 |
| Write new receive buffer size to client CTHANDLE | 32, 33 |
| Set new receive address to client | 34, 35 |
| Write new transmit buffer size to client | 36, 37 |
| Read current transmit buffer address from client | 37, 39 |
| Write offset to the new transmit buffer | 40-43 |
| Set new transmit buffer address to client CTHANDLE | 44, 45 |
| Read client's tinfo structure | 47, 48 |
| Set client window size | 49 |
| Get Kernel32 procedure addresses | 50-59 |
| Call Kernel32 GetSystemDirectory function on client | 60-63 |
| Get client's system folder path | 64, 65 |
| Checking encryption DLL timestamp, call Kernel32 FindFirstFile function on client | 66-71 |
| Call Kernel32 FindClose function on client | 72-75 |
| Load WCEPRV.DLL on client | 76-79 |
| Set encryption communication, read old transmit address | 80, 81 |
| Read old receive address | 82, 83 |
| Call WceSet on client | 84-91 |
| Setup encryption key on client, call WceStartup | 92-99 |
| Get WceSend procedure address | 100-103 |
| Get WceRecv procedure address | 104-107 |
| Set new transmit address | 108, 109 |
| Set new receive address | 110, 111 |
| Enable encryption on client, call WceEnable | 112-119 |
| Check transmit (WceSend) procedure address | 120-123 |
| Check AT-I on client, call Kernel32 FindFirstFile on client | 124-129 |
| Call Kernel32 FindClose on client | 130-133 |
| Load AT DLL on client, call Kernel32 LoadLibrary function | 134-137 |
| Call GetHWInfo on client | 138-147 |
| Call GetEmailAddress on client | 148-155 |
| Read AT-I data | 156, 157 |
| Unload AT DLL on client, call Kernel32 FreeLibrary function | 158-161 |
| Reset encryption, call Free WceEnable on client | 162-165 |
| Write old transmit address | 166, 167 |
| Write old receive address | 168, 169 |
| Free WCEPRV.DLL on client | 170-173 |
| Set flag call successful | 174-185 |
| Send close to agent | 186, 187 |

Call With Advanced Asset Tracking (Every Call—If Client Has Purchased AbsoluteTrack or ComputraceComplete Products) Using AT2 DLL On Client AT-II data (e.g., for AbsoluteTrack & ComputraceComplete customers) is retrieved. Note that this is a super-set of the data collected by the AT1 DLL. Either the AT1 or AT2 DLL will be executed on the client, never both.

| Action | Packets |
| --- | --- |
| Basic Agent Call as Described Above | 1-27 |
| Unlock agent | 28, 29 |
| Allocate one big chunk of memory on the client | 30, 31 |
| Write new receive buffer size to client CTHANDLE | 32, 33 |
| Set new receive address to client | 34, 35 |
| Write new transmit buffer size to client | 36, 37 |
| Read current transmit buffer address from client | 37, 39 |
| Write offset to the new transmit buffer | 40-43 |
| Set new transmit buffer address to client CTHANDLE | 44, 45 |
| Read client's tinfo structure | 47, 48 |
| Set client window size | 49 |

| Action | Packets |
|---|---|
| Get Kernel32 procedure addresses | 50-59 |
| Call Kernel32 GetSystemDirectory function on client | 60-63 |
| Get client's system folder path | 64, 65 |
| Checking encryption DLL timestamp, call Kernel32 FindFirstFile function on client | 66-71 |
| Call Kernel32 FindClose function on client | 72-75 |
| Load WCEPRV.DLL on client | 76-79 |
| Set encryption communication, read old transmit address | 80, 81 |
| Read old receive address | 82, 83 |
| Call WceSet on client | 84-91 |
| Setup encryption key on client, call WceStartup | 92-99 |
| Get WceSend procedure address | 100-103 |
| Get WceRecv procedure address | 104-107 |
| Set new transmit address | 108, 109 |
| Set new receive address | 110, 111 |
| Enable encryption on client, call WceEnable | 112-119 |
| Check transmit (WceSend) procedure address | 120-123 |
| GetHWInfoII, check diag2.dll time stamp. Call Kernel32 FindFirstFile on client | 124-129 |
| Call Kernel32 FindClose on client | 130-133 |
| Load diag2.dll on client | 134-137 |
| Call GetHWInfo on client | 138-147 |
| Call GetHWInfoII on client | 148-155 |
| Read AT-II result | 156, 157 |
| Call EnumSWInstallations on client | 158-166 |
| Allocate necessary memory on client | 167, 168 |
| Send SW CRC to client | 169, 170 |
| Call GetSWInfo on client | 171-178 |
| Read result | 179-189 |
| Call EnumAllPrinters on client | 190-197 |
| Allocate necessary memory on client | 198, 199 |
| Call GetPrinterInfo on client | 200-207 |
| Read result | 208, 209 |
| Call GetEmailAddress on client | 210-217 |
| Read AT-I result | 218, 219 |
| Call EnumAllAccounts on client | 220-227 |
| Allocate necessary memory on client | 228, 229 |
| Call GetAllEmailAddresses on client | 230-237 |
| Read result | 238, 239 |
| Free AT-II DLL on client | 240-243 |
| Check AT-II on client, call Kernel32 FindFirstFile on client | 244-249 |
| Call Kernel32 FindClose on client | 250-253 |
| GetregSW, load diag2.dll on client | 254-257 |
| Call EnumRegSWInstallations on client | 258-265 |
| Allocate necessary memory on client | 266, 267 |
| Write CRC to client | 268, 269 |
| Call GetRegSWInfo on client | 270-277 |
| Read result | 278, 279 |
| Free AT-II DLL on client | 280-283 |
| Check AT-II on client, call Kernel32 FindFirstFile on client | 284-290 |
| Call Kernel32 FindClose on client | 290-293 |
| Load diag2.dll on client | 294-297 |
| Copy search pattern to client | 298, 299 |
| Allocate necessary memory on client | 300, 301 |
| Copy SW license info header to client | 302, 303 |
| Call GetSWLicenseInfoPattern on client | 304-313 |
| Read result | 314-317 |
| Free AT-II DLL on client | 318-321 |
| Reset encryption, call Free WceEnable on client | 322-325 |
| Write old transmit address | 326, 327 |
| Write old receive address | 328, 329 |
| Free WCEPRV.DLL on client | 330-333 |
| Set agent flag call successful | 334-345 |
| Send close to agent | 346, 347 |

Basic Call AND Upgrade Agent Version Remotely (One-Off Based On Tech Support Action)

Check client agent version and compare with version on the server. If client version is lower then perform remote upgrade.

| Action | Packets |
|---|---|
| Basic Agent Call as Described Above | 1-27 |
| Unlock client | 28, 29 |
| Init call environment, allocate one big chunk of memory on the client | 30, 31 |
| Write new receive buffer size to client CTHANDLE | 32, 33 |
| Set new receive address to client | 34, 35 |
| Write new transmit buffer size to client | 36, 37 |
| Read current transmit buffer address from client | 37, 39 |
| Write offset to the new transmit buffer | 40-43 |
| Set new transmit buffer address to client CTHANDLE | 44, 45 |
| Read client's tinfo structure | 47, 48 |
| Set client window size | 49 |
| Get Kernel32 procedure addresses | 50-59 |
| Call Kernel32 GetSystemDirectory function on client | 60-63 |
| Get client's system folder path | 64, 65 |
| Copy NTAgent to client. Call Kernel32 CreateDirectory function on client | 66-69 |
| Call Kernel32 CreateFile on client | 70-73 |
| Copy NtAgent to client | 74-917 |
| Call Kernel32 CloseHandle on client | 918-921 |
| Copy upgrd.exe to client | 921-951 |
| Execute Upgrd.exe on client, get address of client tapi info structure which contains service token | 952, 955 |
| Call Advapi32 CreateProcessAsUser function on client, it restart agent and session is finished | 956-969 |

Basic Call AND Retrieve Make, Model & Serial Number (One-Off Based On Tech Support Action)

Function retrieves make, model and serial number from client and change boot order.

| Action | Packets |
|---|---|
| Basic Agent Call as Described Above | 1-27 |
| Unlock client | 28, 29 |
| Init call environment, allocate one big chunk of memory on the client | 30, 31 |
| Write new receive buffer size to client CTHANDLE | 32, 33 |
| Set new receive address to client | 34, 35 |
| Write new transmit buffer size to client | 36, 37 |
| Read current transmit buffer address from client | 37, 39 |
| Write offset to the new transmit buffer | 40-43 |
| Set new transmit buffer address to client CTHANDLE | 44, 45 |
| Read client's tinfo structure | 47, 48 |
| Set client window size | 49 |
| Get Kernel32 procedure addresses | 50-59 |
| Delete file C:\\DMI.TXT on the client, call Kernel32 DeleteFile function | 60-63 |
| Call Kernel32 GetLastError function on client | 64-67 |
| Call Kernel32 GetSystemDirectory on client | 68-71 |
| Read result from client | 72, 73 |
| Copy ctsetup.ini to client | 74-125 |
| Run ESN specific App, Call Kernel32 GetSystemDirectory function on client | 126-129 |
| Read result from client | 130, 131 |
| Check time stamp of dmiinfo.exe on client. Call Kernel32 FindFirstFile function | 132-137 |
| Copy dmiinfo.exe to client | 138-421 |
| Execute dmiinfo.exe on client | 422-439 |
| Close process handle on client. Call Kernel32 CloseHandle function | 440-443 |
| Close thread handle on client. Call Kernel32 CloseHandle function | 444-447 |
| Call Kernel32 GetLastError on client | 448-451 |
| Delete dmiinfo.exe on client, call Kernel32 DeleteFile function | 452-455 |
| Copy C:\\DMI.TXT from client, open file, call Kernel32 CreateFile function | 456-459 |
| Call Kernel32 GetFileSize on client | 460-463 |
| Calling Kernel32 ReadFile on client in the loop | 464-471 |
| Call Kernel32 CloseHandle on client | 472-475 |
| Delete C:\\DMI.TXT on client | 476-479 |
| Delete CTSETUP.INI on client | 480-483 |

-continued

| Action | Packets |
|---|---|
| Set flag call successful | 484-495 |
| Send close to agent | 496, 497 |

C. The Application Module's Activation Process

The activation process links the Application agent identity to a customer account and installs the Persistent Agent module. This process is described as follows:

The Application Agent connects

The Server uses the extensibility features in the protocol to send down and inventory DLL to identify the computer—this DLL gathers attributes such as the BIOS, chassis and hard-drive serial numbers.

An inventory record is stored on the server and linked to the customer account read from the Application agent.

A unique identifying number (the Electronic Serial Number) is assigned to the device associated with this inventory record.

A typical inventory record is shown below:

```
<?xml version="1.0" encoding="UTF-8" ?>
- <CT:data version="1.00" xmlns:CT="http://www.absolute.com/atinfo/persistence">
- <CT:section name="MachineInfo ">
<CT:setting name="ComputerMakeWMI" value="VIA TECHNOLOGIES, INC.~~" />
<CT:setting name="ComputerModelWMI" value="MS-6321~MS-6321~" />
<CT:setting name="ComputerSerialWMI" value="~~" />
<CT:setting name="ComputerMake" value="VIA TECHNOLOGIES, INC.~~" />
<CT:setting name="ComputerModel" value="MS-6321~MS-6321~MS-6321~" />
<CT:setting name="ComputerSerial" value="~~" />
<CT:setting name="ComputerAsset0" value="" />
<CT:setting name="ComputerAsset1" value="" />
<CT:setting name="SystemSMBIOSVersion" value="" />
<CT:setting name="SystemBiosVersion" value="VIA694 - 42302e31 Award Modular BIOS v6.00PG" />
<CT:setting name="SystemBiosDate" value="08/22/01" />
<CT:setting name="BaseBoardVersion" value="" />
<CT:setting name="HDDSerialNumber0" value="Y3NYPZDE' />
<CT:setting name="HDDSerialNumber1" value="YMDYMLJ0046" />
<CT:setting name="HDDSerialNumber2" value="" />
<CT:setting name="HDDSerialNumber3" value="" />
<CT:setting name="ComputerName" value="PBGR7" />
<CT:setting name="MACAddress0" value="0050ba432204" />
<CT:setting name="MACAddress1" value="0050ba4434da" />
<CT:setting name="OSProductKey" value="VF4BY-WXV47-RR9JQ-H297B-6QQVW" />
<CT:setting name="IBMComputraceStatus" value="FFFFFFFF' />
</CT:section>
</CT:data>
```

D. The Persistent Module's Reactivation Process

Once the Persistent Agent module is launched, the following steps happen to reinstall the Application agent and restore the configuration:

The Persistence Module Agent calls the Monitoring Server (CTSRV)

The Monitoring Server uses the extensibility features in the protocol to send down an inventory DLL to identify the computer—this DLL gathers attributes such as the BIOS, chassis and hard-drive serial numbers and compares with those previously stored.

The inventory record stored at first activation is found and previous ESN associated with this device's inventory is reassigned. The Application agent is downloaded and installed and the Application agent then calls normally.

The above process applies to both BIOS and software persistence (see further discuss below)—i.e. regardless of where the persistence module is located.

Data Delete

Data delete is another example of a service enabled, supported and/or provided by the Agent. As discussed above, the enhanced survivability of the CDA improves tracking physical location of the asset. It is recognized that even when location of asset is established, physical recovery of tracked device is not always feasible due to applicable local laws, police enforcement and burden of proof of ownership. In such instances, programmable capabilities based on the extensible protocol of the CDA offers alternate means of safeguarding confidential or sensitive user data on the device. User defined data files, user profiles or other user defined information, e.g., stored on a hard drive at the client device A, can be deleted under control from the monitoring server. Data deletion can be done on selected data items, or complete device storage medium, including the operating system can be erased, in accordance with the features and options specified by the monitoring server.

Specific examples of Data Delete features and options include:

1. Selective Data Delete—ability to delete all or specific files or directories (and leave the rest of the device intact) based on user preference.
2. Data Delete restart on reboot—Data Delete client to restart itself if the device is rebooted while Data Delete is in progress.
3. 2-stage Data Delete process for full operating system delete—To ensure that the Agent (e.g., the CDA) uploads the log files when a "full O/S Data Delete" option is specified by the monitoring server, Agent undertakes a 2-stage delete process. Log files are obtained by the monitoring server from the Agent after a first stage delete before deleting the operating system in a second stage. The full O/D Data Delete option includes the following steps:
   a) Delete all files except the O/S
   b) Force an agent call and upload the logfiles
   c) Delete the O/S files
4. Data Delete override—Data Delete executable is turned off by the monitoring server to stop the Data Delete running again if the computer is subsequently recovered.
5. Data Delete Pre-launch check—Additional pre-launch Data Delete checks for an affected client device is provided by the monitoring server to ensure: (a) theft report exists for the affected client device, (b) client device is positively identified and no duplicates exist, (c) there is authorization by the client device owner (e.g., a pre-authorization agreement in place between the owner representative and the entity maintaining the monitoring server such as the host monitoring station).
6. Notification—when launching Data Delete, notifications (e.g., via email, SMS—short messaging service) are send to the interested parties (e.g., authorizing owner representative, and/or requester).

Figure 15:
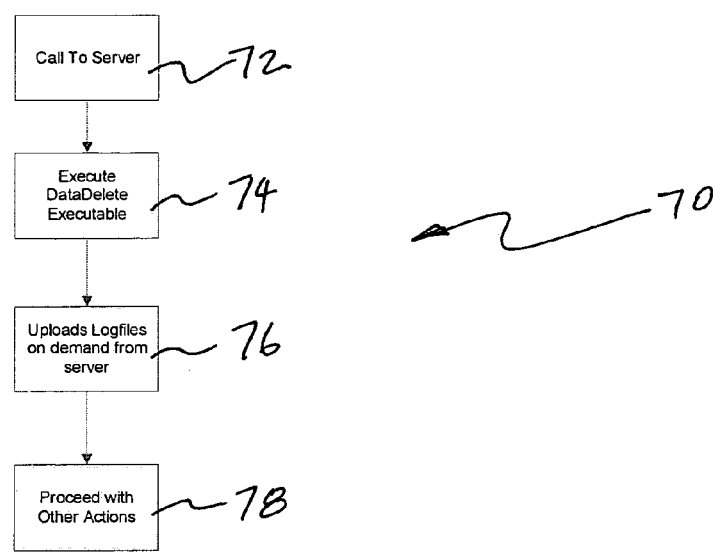
FIG. 15 is a schematic flow diagram depicting the client side Date Delete routine of the CDA in accordance with one embodiment of the present invention.
Figure 16:
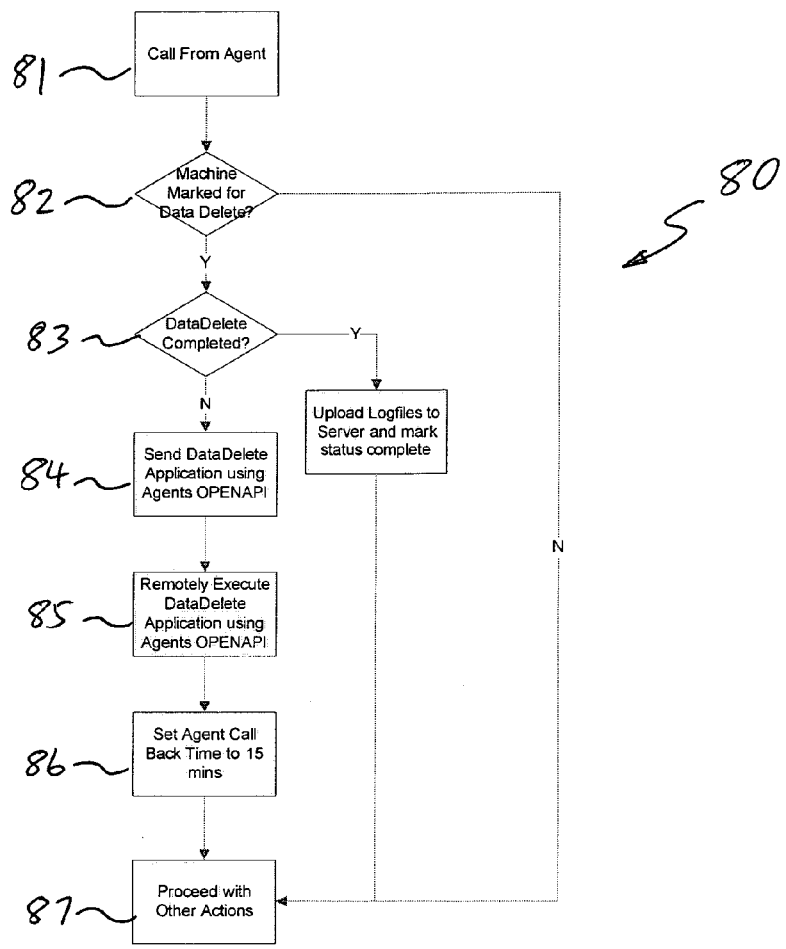
FIG. 16 is a schematic flow diagram depicting the server side Data Delete routine in accordance with one embodiment of the present invention.
Figure 17:
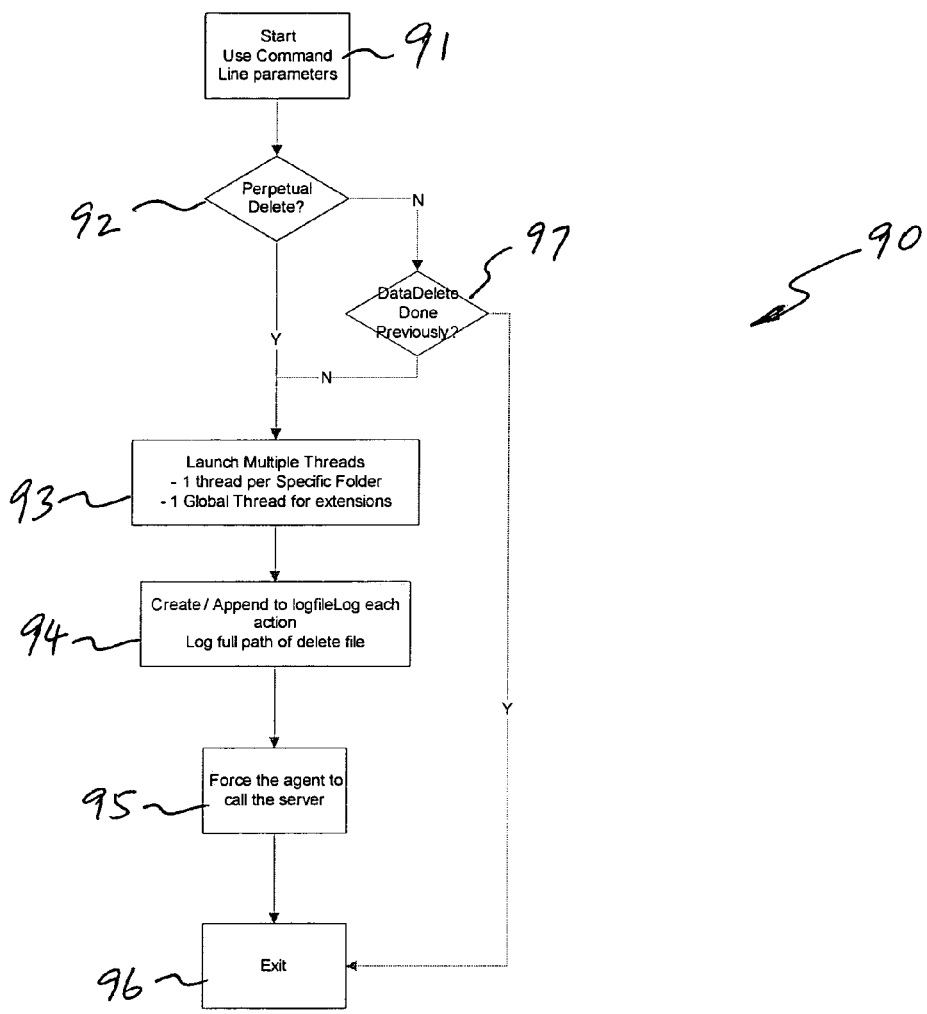
FIG. 17 is a schematic flow diagram depicting the Data Delete executable routine in accordance with one embodiment of the present invention.

FIG. 15 is a schematic flow diagram depicting the client side Date Delete routine 70 of the CDA in accordance with one embodiment of the present invention. FIG. 16 is a schematic flow diagram depicting the server side Data Delete routine 80 in accordance with one embodiment of the present invention. FIG. 17 is a schematic flow diagram depicting the Data Delete executable routine 90 in accordance with one embodiment of the present invention. Referring to these figures, in a typical Data Delete operation on the server side, when the full function CDA contacts the monitoring server at 72 and 81, the identity of the device is verified. If the device is verified to have been marked for data delete actions at 82, then the extensible communication protocol described above is used to trigger the data delete executable or sub-functions of the CDA at 74. Data delete executable or sub-functions are called at 84 and 85 with parameters defining the data to be deleted (at 91), with wildcard variables to delete complete data structures. The server instructs the Agent at 86 to contact back the server within a set period of time (e.g., 15 minutes). CDA sub-functions may use US Department of Defense recommended algorithms to delete the data so as to make it non-recoverable (e.g., US Department of Defense Standard 5220.22-M Clearing and Sanitization Matrix). CDA sub functions also use available built in operating system support to delete data. These data deletion algorithms and mechanisms are publicly well known by persons skilled in the art, and actual delete mechanism does not alter the system capabilities being described herein.

The data delete application will delete applications and data on the hard drive at 93, for example, then will make a call back in to the monitoring server at 95, where it will upload at 76 and 88 a report (e.g., logfiles) to the server detailing the success of the data delete application (e.g., at 94, create/append to logfile a log of each action, and/or log full path of deleted file). If the data delete application has been instructed to exclude deletion of the operating system, the data delete application will delete all data and application files, except those required for the operating system and the Agent function. At the end of the delete process at 83, the Agent will attempt to return at 94 a status report (e.g., logfiles) to the monitoring server at 76 and 88. The client device will remain operational after the delete process. The Data Delete routine for the server and the Agent would proceed with other actions at 78 and 87. For example, if the data delete application has also been instructed by the server to delete the operating system, it will then continue to delete the operating system files.

The routine for data delete of the operating system is as follows. In the first pass, the data delete application will delete all data and application files, except those required for the operating system and the Agent to function. At the end of the first pass in the delete process, the Agent returns a status report to the monitoring server. The data delete application will then continue to delete the remainder of the files on the device. This may cause the device to become non-operational. The Agent may not be able to call the monitoring server once the full data delete process has been completed. If the user reinstalls an operating system, the Agent will regain its original function.

In either configuration, the data delete service has the following features:
Writes a pattern of 0 and 1 three times to the file
Writes random data to the file
Changes the file attributes to "directory"
Changes file date/time stamp to a fixed value
Sets the file size to "0"
Changes the file name to a randomly-generated file name
Removes the new file name from the directory In keeping with the objective to operate as stealthily as possible, the data delete application is disguised. The service that runs during the delete process is titled "WCTSYS.EXE", in an attempt to conceal the delete process running in the background. If the user stops the process before the deletion is completed, the application is able to resume the deletion process where it left off, once the Agent makes it's next call to the monitoring server. For example, at 92, the Agent determines if data delete is perpetual. If perpetual, then proceed to rest of date delete functions (i.e., 93, etc.) If not perpetual, and if data delete has not been completed before (at 97), the process proceeds to data delete functions. If data delete has been completed (at 97), the data delete process terminates. For all client devices enabled with data delete, the Agent call back period may be set to a predetermined value for both modem and IP calls (e.g., at 86).

The time required for the data delete process to complete is dependant on a number of variables, including the speed of the processor, the size of the hard drive, the amount of data to be deleted and the amount of activity already taking place on the client device. It has been determined that the data delete process can be expected to take between several minutes to half an hour or more to complete.

The report that is returned on a successful deletion contains the following information:
Confirmation that the Data Delete application was downloaded and executed
List of files deleted
Change in hard drive space (This information will only be available if the asset tracking service has been enabled, so data can be collected from the PC.

This information may be provided to the user on the success of the Data Delete process.

The functionality of the data delete can be controlled by a policy file downloaded from the server, at 84 or 85. The policy file will dictate to Data Delete application what files, folders, or file types to delete. The policy can also dictate other data selection criteria.
Sample Policy File Format as implemented.

---

|items||item name=|*.extensionToBeDeleted| type=|U|
instruction=|P$C:\ *.extensionToBeDeleted| seq=|0|/|
   |item name=|C:\FolderNameToBeDeleted\| type=|U|
instruction=|P$C:\ FolderNameToBeDeleted\| seq=|1|/|
   |item name=|C:\LJ\FilenameWithExtensionToBeDeleted | type=|U|
instruction=|P$C:\LJ\FilenameWithExtensionToBeDeleted | seq=|2|/|
   |/items|

---

Further Application of Extensible Protocol

As noted above and further below, full function CDA and mini-CDA (e.g., in the non-BIOS or software persistence embodiments) use the extensible protocols to keep itself current with the most up to date version available on the monitoring server. It also uses this capability to keep other asset tracking extensions updated to the current version. Generic sub-functions included in the extensible protocol are generic and flexible so they can be leveraged to have a multitude of functionalities, in addition to asset tracking and data delete described above. An example of another application of the extensible protocol is to provide downloading and launching applications from the monitoring server. An executable file can be downloaded into memory and then launched. Alternatively, an installer can be downloaded from the monitoring server and launched to install an application, or upgrade an existing application.

Examples applications that leverage the agent's extensible protocol to provide functionality include:
Persistent Firewall: The Agent can download and enforce network communication firewall. The Agent can also monitor and correct any changes to firewall configurations or removal or disabling of the firewall. Since the Agent is persistence (cannot be detected or removed) it can provide and enforce security features such as firewall in a much more persistence way.
Data Encrypt: Persistence Agent, upon instruction from the server, can encrypt the data on the machine. This will enable data protection in a theft or loss scenario, in a much more persistent mechanism. Agent can also change the encryption keys or passwords post theft to protect user's data. Changing encryption passwords or keys can also protect machines in internal theft scenarios where the user knows the passwords.

Location Tracking: One of the primary functions of the Agent is to contact the host monitoring system to report the identity and physical location of the device. The physical location can be implied by the machine's IP address or other related network parameters. The agent could use data from built in GPS receivers or cellular network receivers and transmitters for identifying the physical location of the device. In these configurations, the agent can log GPS or Assisted GPS location information (current, or a series of logged information). The CDA can periodically read the GPS location and create a log file, that can be uploaded to the server during a call.

Alternate Embodiments of Modules

This invention can be implemented in a variety of embodiments of Persistent Agent to adapt to their specific environment based upon factors including, but not limited to: (a) different BIOS implementations from different device (e.g., PC) manufacturers; (b) different interface requirements with the BIOS; (c) variation of flash memory space available from different device manufacturers or on different device models; and (d) ability to work without a BIOS PCI Option ROM enumeration hook. To adapt to these factors, the CLM is formatted as a PCI Option ROM and the AIM and CDA may be stored separately, or being bound to the CLM. The CLM shrinks down to a small stub at the end of the POST cycle. If the device has a BIOS that does not enumerate the PCI Option ROM, then the CLM may reside in a partition gap and use a substitute Master Boot Record (MBR). The different embodiments of the Persistent Agent module configurations are described more fully below.

A. Flash-Resident

In the flash-resident embodiment of the invention, the CLM, AIM and mini CDA are all loaded in the BIOS flash image. This approach leverages existing processes used in BIOS where PCI Option ROMs are loaded from the BIOS flash image. The additional modules (the AIM and the mini CDA) may be stored separately in flash or bound to the CLM in PCI Option ROM, as is in the case of FIG. 3.

Figure 11:
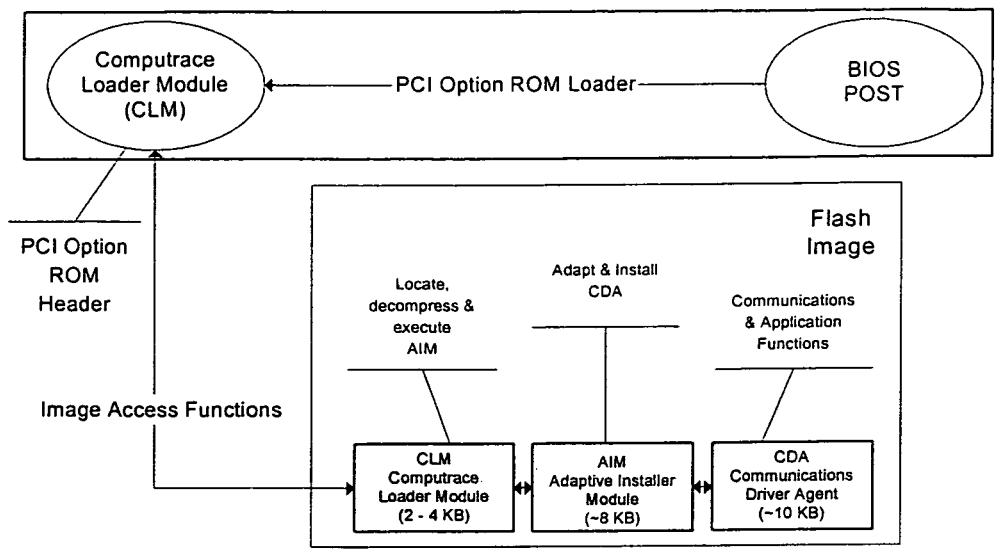
FIG. 11 is a schematic depiction of Flash Image Management, in accordance with one embodiment of the present invention.

If the AIM and mini CDA are bound to the CLM, an 18-20 KB PCI Option ROM is loaded by POST into upper shadow memory and the AIM is unpacked by the CLM. The AIM in turn adapts and configures the mini CDA for the system and returns control to the CLM. The CLM shrinks the size of PCI Option ROM image to a minimum and remains in the upper memory region as a 2 KB ROM block. If the AIM (~6 KB) and CDA (~10 KB) are simply stored in the flash image, and not bound to the CLM, the CLM incorporates additional image access functions to locate and unpack the AIM and mini CDA. The operation of the CLM, AIM, and mini CDA are similar to the bound method above. The size of the CLM is slightly larger and specially tailored to the platform for which the flash image is targeted. This approach assumes the pre-establishment of a vendor ID to allow recognition of the flash-resident PCI Option ROM. The management of the flash image is depicted in FIG. 11.

B. Hard Drive Partition Gap

Depending on BIOS-specific space limitations, there may not be sufficient space in the BIOS flash memory for all the modules of the complete Persistent Agent. In this case, depending on the device vendor support, the AIM, or the AIM and the mini CDA may be resident in a user inaccessible area in a mass storage device, such as the hard drive partition gap. This is and example of a form of "software persistence" In this embodiment, the CLM still resides in flash and gets called during the PCI Option ROM enumeration process as in the earlier embodiment, but CLM loads AIM, which in turn executes the CDA from another location.

Figure 13:
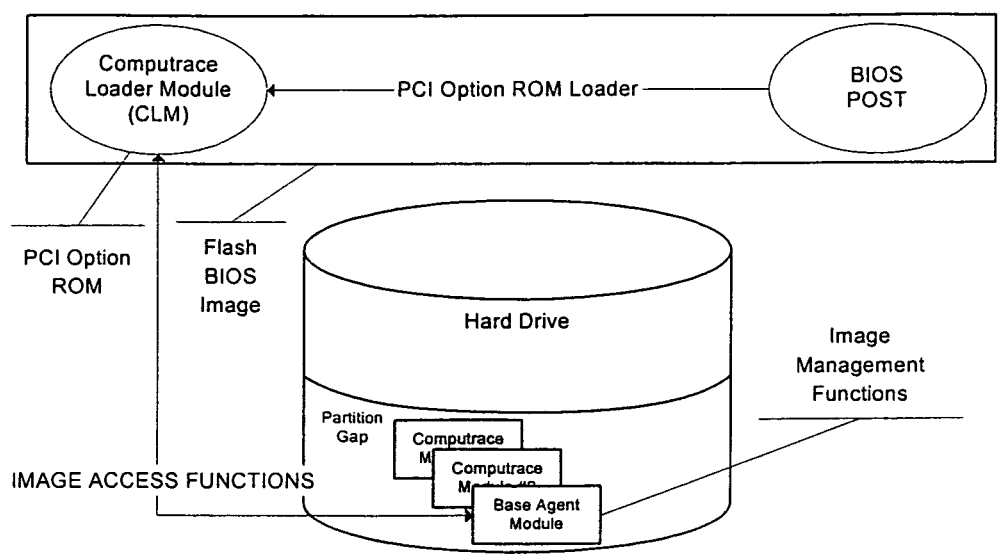
FIG. 13 is a schematic depiction of Partition Gap Image Management, in accordance with one embodiment of the present invention.

FIG. 13 depicts the partition gap image management involved in the situation in which the additional modules of the Persistent Agent will reside within the partition gap. This gap exists between the MBR and the first partition. The gap is 62 sectors, for example, on most new hard drives, but some of the sectors are reserved by the installation utility to maintain compatibility with other software and the useable size is about 27 Kb. This size is sufficient to include the base modules of the Agent (AIM, CDA) necessary to communicate with the server and bootstrap the rest of the modules into the OS.

C. Host Protected Area (HPA)

Figure 12:
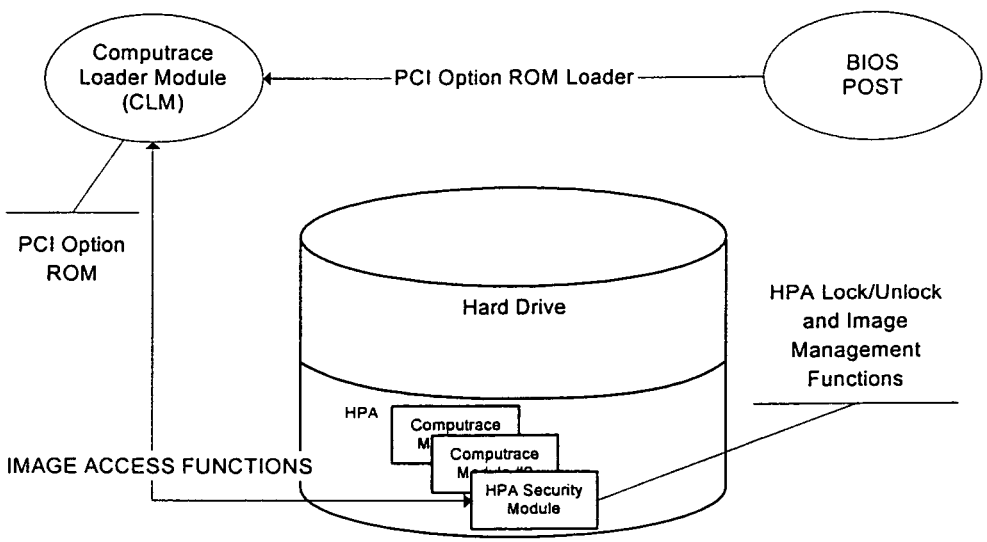
FIG. 12 is a schematic depiction of Host Protected Area Image Management, in accordance with one embodiment of the present invention.

Referring to FIG. 12, alternatively, in a situation in which there may not be sufficient space in the BIOS flash memory for all the modules, instead of storing the additional modules of the Persistent Agent (i.e., AIM, and/or mini CDA) in the hard drive partition as in the previous embodiment, the additional modules of the Persistent Agent will reside in another user inaccessible area on the mass storage device, such as within the HPA, or its functional equivalent. This is another example of software persistence. Additional support is required to Lock and Unlock HPA. This HPA access mechanism will be PC OEM specific. The images within the HPA may need to be managed at runtime. The driver and applications will support the existing methods to authenticate with the BIOS interfaces and obtain the necessary runtime access to manage our portion of the HPA space. In this embodiment, the CLM still resides in flash and gets called during the PCI Option ROM enumeration process as in the earlier embodiment, but CLM loads AIM, which in turn executes the CDA from another location.

D. Non Flash CLM

While the most secure embodiments will involve the CLM being resident in the BIOS flash memory, there may be enviromnents where this is not supported. This may be the case where OEM has not configured the BIOS to enumerate the CLM header in flash during PCI Option ROM scan. On these systems, an alternative location for the CLM will still provide a superior solution relative to existing products. The use of a substitute Master Boot Record offers a solution to this. In this embodiment, the CLM loads from the substitute Master Boot Record. CLM then loads and passes control to the AIM and mini CDR, which would be located in the partition gap, as described in the earlier embodiments. The substituted MBR approach for an agent subloader has been patented by the assignee, and incorporated by reference herein. The CLM herein may take advantage of similar subloading approach, although in the present invention, the CLM has additional and different functions in relation to the AIM and CDA not found in the earlier patents.

E. Integrated into Flash-Resident Operating System Image

In this embodiment, the mini-CDA is integrated into an operating system image entirely stored in flash memory. Persistence is achieved by being included in the persistent operating system image and is protected by the same security mechanisms used to protect accidental and deliberate modifications to the operating system. In this case, the mini-CDA or is directly loaded and run by an operating system utility. The full-function CDA is subsequently downloaded and installed into volatile memory. In another very similar embodiment, a CLM is loaded by the operating system utility and it subsequently loads and runs the mini-CDA. In this latter case, both the CLM and the mini-CDA are included in the persistent operating system image.

F. Server Initiated Communications

In this embodiment, the server initiates communications with the CDA instead of waiting for the CDA to initiate communication with the server. Server initiated communications permits the execution of server instructions that are time critical and cannot wait until the next scheduled call by the client. In this case, the server may use the same or a different communications network and protocol from the principal network or protocol used by the CDA to call the server. An example of a time sensitive scenario is the execution of a data delete operation on a misplaced or stolen mobile device before communications are interrupted by the network operator as a result of the device being reported stolen. Any time-sensitive service may be invoked in this manner.

G. Integrated into the Operating System Distribution

In this embodiment, the mini-CDA is integrated into an operating system distribution (e.g., software, firmware of hardware). Persistence is achieved by being included as a fundamental, inseparable component of the operating system. In this case, it is protected by the same security mechanisms used to protect accidental and deliberate modifications to the operating system. In the case of operating system reinstallation, the mini-CDA is reinstalled from the operating installation medium and, as a result, the services provided by the mini-CDA are enabled in the second installation. In this embodiment, the mini-CDA is directly loaded and run by an operating system function. The full-function CDA is subsequently downloaded and installed as in other embodiments.

H. Extensible Firmware Interface (EFI)

The BIOS embodiment of the persistence modules (i.e. AIM and CLM) can be modified to install the mini-CDA or the agent in an EFI environment, either as an EFI driver or EFI application prior to OS loader. Persistence is achieved when the EFI loads CLM, which then uses AIM to install or restore mini-CDA similar to the BIOS embodiment. The mini-CDA, after OS boot can then download and install the full featured agent, as in BIOS embodiment.

Optimization

The CLM PCI Option ROM is not difficult to integrate into the system BIOS. For example, the IBM Model T43 notebook computer is installed with an IBM BIOS having an option ROM structure. Its form and function parallels video option ROMs or motherboard controller option ROMs already existing in the BIOS. In the simple case, the BIOS must simply be reconfigured to recognize the vendor ID of the CLM. If the form and function of the CLM is more tightly integrated to the host BIOS, some size-optimization can occur. There is an opportunity to save a little space in the ~20 KB required to store the CLM, AIM, and CDA modules within the Flash Image. Below is a table listing various functions within the three main modules and the approximate size of each major functional group. The "optimization" column lists an estimate of the optimization opportunity of the functional group within each module.

| Function | Size | Module | Optimization |
| --- | --- | --- | --- |
| OS Detection | 2 KB | AIM | n/a |
| File System Support | 6 KB | AIM | n/a |
| IP/HTTP support | 4 KB | CDA | n/a |
| Application Layer | 4 KB | CDA | n/a |
| Service Layer | 1 KB | CDA | n/a |

-continued

| Function | Size | Module | Optimization |
| --- | --- | --- | --- |
| Adaptive Layer | 1 KB | CDA | n/a |
| PCI Function | .5 KB | CLM | 0 KB |
| Image Management | .5 KB | CLM | .3 KB |
| Execution Environment | 1 KB | CLM | .8 KB |

Of the various functions in the modules, only the CLM functions (PCI, Image Management, and the Execution Environment) may be optimized with specific support from the host BIOS. The size of the Image Management functions can be reduced by about 0.3 KB by using the compression algorithm of the BIOS and by using the "bound" method to store the AIM and CDA modules. The size of the Execution Environment setup and control function can reduced by 0.8 KB by ensuring that the PCI Option ROM is loaded late in POST so that all disk resources are available and that POST Memory Manager support is not needed. The lower range of the ~20 KB size is about ~18.9 KB. On the upper side, if platform specific support is needed within the CLM, it may grow by 2 KB.

If the BIOS interface exposes an application program interface (API) for detecting and configuring the CLM through SMBIOS, then the 2 KB visible ROM "stub requirement" is relaxed.

Persistent Servicing Agent Deployment in Portable Digital Devices

The persistent servicing Agent may be extended to track additional devices, such as portable digital devices. The intelligent Agent may reside in BIOS Option ROM, partition gap on hard drive, hard drives Host protected area (HPA), embedded firmware (e.g., OS ROM) of a consumer electronic device (e.g. Apple IPOD™ digitial media player, MP3 player, cell phone or gaming device such as Microsoft XBOX™ or Sony PlayStation™). Once the CDA executes, it will communicate with the monitoring server (either CDA initiated or server initiated communication), as described in examples discussed above. CDA functions can be generic functions such as copy to memory, copy from memory and execute from memory. These functions will be executed based on the sequences provided by the monitoring server during the communications with the CDA. These sequences can be executed to copy an application into memory, execute it, and read the results back to the monitoring server. The persistent agent may be programmable, as disclosed above.

The persistent servicing Agent may be deployed in various portable and/or personal digital devices, for example:

Personal digital assistant (PDA)

Digital media devices, such as an MP3 player, digital recorder, portable TV, radio, etc.

Wireless devices, such as a cellular phone, two-way radio, etc.

Handheld devices, such as global positioning system (GPS), etc.

Gaming devices, such as portable versions of computer gaming (Nintendo, Sony PlayStation), etc.

Digital cameras

Specific examples of deployment of Agent includes:

1. IPOD™ Digital Media Player

The Agent would be programmed to contact, or be contacted by, a monitoring server proactively. Agent will be in a standby state until the device is connected to the Internet, or connected to another base device (e.g., a personal computer) that is connected to the Internet. Once the device connects to a third party website (such as ITunes), the Agent would use the website's embedded controls to connect to the monitoring server. Alternatively, the Agent could install a copy of itself, or another Agent onto the connected base device to connect to the monitoring server. Once connected, the Agent validates the device's status from the monitoring server. The validation may include checking a unique identification information of the device (e.g., an electronic serial number (ESN), manufacturer's serial number, or a serial number embedded into the Agent). This unique identification information would be matched against a database at the monitoring server. If the portable device is flagged missing (e.g., by the device's original owner or representative), the Agent will trigger the portable device to render itself non-functional (e.g., Data Delete discussed above, or shut off or disable or other similar actions rendering at least certain functions of the portable device inoperable at least to some extent to discourage continue use of the portable device). Alternatively or in addition, the Agent will trigger the device to display informational messages to the person in possession of the portable device. The message could instruct that person to contact the owner, device vendor or an asset tracking company for further information, such as return of device to its owner, associated rewards for return or re-enabling of the device.

2. Cell Phone:

The Agent would be programmed to contact a monitoring server proactively (e.g., server initiated or Agent initiated). Once the device is connected to the wireless network, the Agent could use standard communication protocols to communicate with the monitoring server, or alternatively or in addition send SMS messages (or another choice of protocol) to the monitoring server or the owner representative. Once connected, the Agent would validate the device's unique identification information against the database at the monitoring server. The validation may include checking the identification number, such as ESN or serial number of the device (manufacturer's serial number or a serial number embedded into the Agent, or SIM card ID etc. This unique identification information would be matched against a database at the monitoring server. If the device is flagged missing by the device's original owner, the agent will trigger the device to render itself non-functional (e.g., Data Delete discussed above, or shut off or disable or other similar actions rendering at least certain functions of the portable device inoperable at least to some extent to discourage continue use of the portable device). Alternatively or in addition, the Agent will trigger the device to display informational messages to the person in possession of the portable device. The message could instruct that person to contact the owner, device vendor or an asset tracking company for further information, such as return of device to its owner, associated rewards for return or re-enabling of the device.

3. Gaming Console:

The Agent would be programmed to contact a monitoring server proactively (e.g., server initiated or Agent initiated). Once the gaming device connects to an online gaming server, the agent could use standard communication protocols (e.g., IP) embedded into the gaming site to communicate with the monitoring server. Alternatively it could send TCP/IP or standard Internet protocols to another third party monitoring server. Once connected, the Agent would validate the device's unique identification information, and take appropriate actions in much the same manner as the earlier embodiments described above.

The servicing Agent as disclosed above has the ability to be persistent in spite of actions that might ordinarily be expected to remove it. The programmable capabilities of the Agent allows its functionality to be extended based on server-driven commands. The invention improves upon the ability for a pre-deployed servicing Agent to remain "active" regardless of the actions of a "user" of the device. The users' actions with respect to the Agent may be intentional or accidental. The invention protects the authorized user from the accidental removal of the servicing Agent, while allowing the legitimate need to disable the Agent (for example at end of life of the computer asset). The invention prevents an unauthorized user from removing the Agent software. The persistent attributes of the present invention have value in both security and asset management applications. In the context of a secure, stealthy device-tracking software application, the invention is of significant value as it makes theft of a valuable asset much more difficult to disguise, as regardless of actions taken by a thief, the software will persist and make itself available for contacting a remote monitoring center. In addition, the persistent nature of the servicing Agent provides peace of mind to security personnel, as it provides confidence that the tracking Agent cannot be accidentally removed. In the context of a secure asset management application, this is of further value as it ensures continuity of tracking an asset over its whole lifecycle. A key challenge for IT administrators today is the ability to track assets over the whole lifecycle. During the lifecycle devices are frequently transferred from one user to another, during which they may be re-imaged, or have the operating reinstalled or otherwise be subjected to maintenance procedures that render tracking of the asset difficult.

The process and system of the present invention has been described above in terms of functional modules in block diagram format. It is understood that unless otherwise stated to the contrary herein, one or more functions may be integrated in a single physical device or a software module in a software product, or one or more functions may be implemented in separate physical devices or software modules at a single location or distributed over a network, without departing from the scope and spirit of the present invention.

It is appreciated that detailed discussion of the actual implementation of each module is not necessary for an enabling understanding of the invention. The actual implementation is well within the routine skill of a programmer and system engineer, given the disclosure herein of the system attributes, functionality and inter-relationship of the various functional modules in the system. A person skilled in the art, applying ordinary skill can practice the present invention without undue experimentation.

While the invention has been described with respect to the described embodiments in accordance therewith, it will be apparent to those skilled in the art that various modifications and improvements may be made without departing from the scope and spirit of the invention. For example, the information extraction application can be easily modified to accommodate different or additional processes to provide the user additional flexibility for web browsing. Accordingly, it is to be understood that the invention is not to be limited by the specific illustrated embodiments, but only by the scope of the appended claims.

The invention claimed is:

1. A persistent servicing agent disposed in an electronic device connected to a network to a remote server, to enable, support and/or provide at least one service with respect to the electronic device, comprising:

a driver agent concealed in the electronic device, wherein the driver agent is configured to be persistent against external tampering, including self-healing in the event of tampering, and wherein the driver agent comprises at least a partial driver agent concealed electronically in a user inaccessible location in the electronic device, wherein the partial driver agent determines whether a full function driver agent configured to communicate with the network in providing the service is available in the electronic device, and wherein the partial driver agent is configured with a reduced set of functions compared to the full function driver agent; and a run application configured to automatically initiate operation of the driver agent without user initiation or user intervention.

2. The persistent servicing agent as in claim 1, wherein driver agent is configured to enable, support and/or provide service comprising at least one of asset tracking, asset recovery, software deployment, data deletion, firewall protection, data encryption, location tracking, message notification, and software upgrade.

3. The persistent servicing agent as in claim 1, wherein the driver agent is configured to enable, support and/or provide data deletion service to delete selected data files at the electronic device, and wherein the driver agent provides a report of the data deleted to the remote external server.

4. The persistent servicing agent as in claim 3, wherein the driver agent is configured to enable, support and/or provide deletion of operating system of the electronic device.

5. The persistent servicing agent as in claim 4, wherein the driver agent is configured to first delete data files other than the operating system, provide the report to the remote server, and then delete the operating system.

6. The persistent servicing agent as in claim 3, wherein the driver agent is configured to reinitiate data deletion service in the event a prior data deletion service was interrupted before completion.

7. The persistent servicing agent as in claim 2, wherein the partial driver agent is located in the electronic device in at least one of a firmware, software and hardware.

8. The persistent servicing agent as in claim 7, wherein the firmware comprises a non-volatile memory.

9. The persistent servicing agent as in claim 8, wherein the non-volatile memory comprises at least one of a BIOS chip and flash memory.

10. The persistent servicing agent as in claim 7, wherein the software comprises an operating system of the electronic device.

11. The persistent servicing agent as in claim 3, wherein the driver agent is configured to communicate with the remote server, to receive instructions from the remote server in connection with data deletion of selected data files in the electronic device.

12. The persistent servicing agent as in claim 2, wherein the driver agent is configured to communicate with the remote server, to receive instructions from the remote server to perform the service in accordance with such instructions, wherein such communication may be initiated by the driver agent or the server.

13. The persistent servicing agent as in claim 12, wherein the driver agent is configured to communicate with the remote server, to receive instructions from the remote server in connection with establishing firewall protection in the electronic device.

14. The persistent servicing agent as in claim 12, wherein the driver agent is configured to communicate with the remote server, to receive instructions from the remote server in connection with undertaking data encryption in the electronic device.

15. The persistent servicing agent as in claim 12, wherein the driver agent is configured to communicate with the remote server, to receive instructions from the remote server in connection with location tracking of electronic device.

16. The persistent servicing agent as in claim 12, wherein the driver agent is configured to communicate with the remote server, to receive message notification and/or instructions to disable certain functionality of the electronic device.

17. The persistent servicing agent as in claim 1, wherein driver agent is configured to enable, support and/or provide service comprising changing at least one of an encryption key and a password.

18. The persistent servicing agent as in claim 1, wherein the run application comprises:
an installer application configured to automatically adapt the driver agent to an operating environment of the electronic device to provide the service; and
a loader application configured to automatically load the installer application, which in turn loads the driver agent.

19. An electronic device, comprising a persistent servicing agent disposed in an electronic device connected to a network to a remote server, to enable, support and/or provide at least one service with respect to the electronic device, wherein the persistent servicing agent comprises:
a driver agent concealed in the electronic device, wherein the driver agent is configured to be persistent against external tampering, including self-healing in the event of tampering, and wherein the driver agent comprises at least a partial driver agent concealed electronically in a user inaccessible location in the electronic device, wherein the partial driver agent determines whether a full function driver agent configured to communicate with the network in providing the service is available in the electronic device, and wherein the partial driver agent is configured with a reduced set of functions compared to the full function driver agent; and
a run application configured to automatically initiate operation of the driver agent without user initiation or user intervention.

20. A method of enabling, supporting and/or providing a service in an electronic device, comprising:
concealing a driver agent electronically in the electronic device, wherein the driver agent is configured to be persistent against external tampering, including self-healing in the event of tampering, and wherein the driver agent comprises at least a partial driver agent concealed electronically in a user inaccessible location in the electronic device, wherein the partial driver agent determines whether a full function driver agent configured to communicate with the network in providing the service is available in the electronic device, and wherein the partial driver agent is configured with a reduced set of functions compared to the full function driver agent;
providing a run application configured to automatically initiate operation of the driver agent without user initiation or user intervention; and
operatively connecting the driver agent to a network to communicate with a remote server, to receive instructions relating to the service.

21. The method as in claim 20, wherein the service comprises at least one of asset tracking, asset recovery, software deployment, data deletion, firewall protection, data encryption, location tracking, message notification, and software upgrade.

22. The method as in claim 20, wherein the driver agent is configured to enable, support and/or provide data deletion service to delete selected data files at the electronic device, and wherein the driver agent is configured to enable, support and/or provide deletion of operating system of the electronic device.

23. The method as in claim 22, wherein the driver agent is configured to first delete data files other than the operating system, provide the report to the remote server, and then delete the operating system.

24. A system for providing at least one service at an electronic device connected to a network, comprising:
- a remote server connected to the network;
- a persistent servicing agent disposed in the electronic device, comprising a driver agent concealed in the electronic device, wherein the driver agent is configured to be persistent against external tampering, including self-healing in the event of tampering, wherein the driver agent comprises at least a partial driver agent concealed electronically in a user inaccessible location in the electronic device, wherein the partial driver agent determines whether a full function driver agent configured to communicate with the network in providing the service is available in the electronic device, and wherein the partial driver agent is configured with a reduced set of functions compared to the full function driver agent; the persistent servicing agent further comprising a run application configured to automatically initiate operation of the driver agent without user initiation or user intervention;
- wherein the persistent agent communicates with the remote server to receive instructions from the remote server to perform the service in accordance with such instructions.

25. The system as in claim 24, wherein such communication may be initiated by the driver agent or the server.

26. The system as in claim 24, wherein the persistent servicing agent is configured to communicate with the remote server, to receive instructions from the remote server in connection with at least one of:
- (a) establishing firewall protection in the electronic device;
- (b) undertaking data encryption in the electronic device;
- (c) location tracking of electronic device;
- (d) receiving message notification; and
- (e) disabling certain functionality of the electronic device.

\* \* \* \* \*